United States Patent [19]

Kozaki et al.

[11] Patent Number: 5,762,581

[45] Date of Patent: Jun. 9, 1998

[54] AUTOMATIC TRANSMISSION CONTROL SYSTEM FOR IMPROVING SHIFT QUALITY DURING SHIFTING

[75] Inventors: Tetsuji Kozaki, Aichi-ken; Masami Fujitsuna, Kariya, both of Japan

[73] Assignee: Nippondenso Co., Ltd., Kariya, Japan

[21] Appl. No.: 653,354

[22] Filed: May 24, 1996

[30] Foreign Application Priority Data

May 24, 1995 [JP] Japan ................................. 7-124983

[51] Int. Cl.[6] ................................................ F16H 61/00
[52] U.S. Cl. ............................. 477/174; 477/86; 477/109
[58] Field of Search ............................... 477/143, 107, 477/109, 86, 110, 174, 175

[56] References Cited

U.S. PATENT DOCUMENTS

| | | | |
|---|---|---|---|
| 4,822,113 | 4/1989 | Amberg et al. | 364/426.02 |
| 5,060,747 | 10/1991 | Eto | 364/424.1 X |
| 5,190,130 | 3/1993 | Thomas et al. | 477/174 X |
| 5,534,764 | 7/1996 | Masaki et al. | 364/424.04 X |
| 5,577,979 | 11/1996 | Iizuka | 477/109 |
| 5,627,750 | 5/1997 | Kono et al. | 477/86 X |

FOREIGN PATENT DOCUMENTS

| | | |
|---|---|---|
| 61-106654 | 7/1986 | Japan . |
| 62-167961 | 7/1987 | Japan . |
| 4-25663 | 1/1992 | Japan . |
| 5-79550 | 3/1993 | Japan . |
| 5-35294 | 5/1993 | Japan . |

*Primary Examiner*—Khoi Q. Ta
*Attorney, Agent, or Firm*—Cushman Darby & Cushman IP Group of Pillsbury Madison & Sutro LLP

[57] ABSTRACT

A hydraulic control system for an automatic transmission is disclosed which includes a feedback hydraulic control circuit and a hydraulic correcting circuit. The feedback hydraulic control circuit controls the hydraulic pressure supplied to frictional elements of the automatic transmission under feedback control during a shift operation for adjusting the speed of an input shaft or a rate of change in speed of the input shaft of the automatic transmission to agree with a target speed or a target rate. The hydraulic correcting circuit corrects an output of the feedback hydraulic control circuit so as to suppress vibrations of torque transmitted through a drive train of the automatic transmission caused by control of the hydraulic pressure carried out by the feedback hydraulic control circuit within a range of a resonance frequency of the drive train of the automatic transmission.

9 Claims, 18 Drawing Sheets

AUTOMATIC TRANSMISSION CONTROL SYSTEM FOR IMPROVING SHIFT QUALITY DURING SHIFTING

BACKGROUND OF THE INVENTION

1 Technical Field

The present invention relates generally to an automatic transmission control system for vehicles, and more particularly to a hydraulic control system for an automatic transmission designed to control line pressure supplied to frictional elements of the automatic transmission during a shift operation so that a shift shock with which vehicle passengers feel uncomfortable is eliminated.

2 Background of Related Art

Generally, a gear shift of an automatic transmission for automotive vehicles is achieved by supplying hydraulic pressure to frictional elements of the automatic transmission such as clutches and brakes according to traveling conditions of the vehicle.

In order to protect mechanical components of the automatic transmission and to provide good riding comfort to the vehicle passengers, it is necessary to supply the hydraulic pressure to the automatic transmission at a moderate rate.

Japanese Patent Second Publication No. 5-35294 teaches a hydraulic control system for an automatic transmission which adjusts hydraulic pressure supplied to the automatic transmission under feedback control to hold it above a minimum pressure level changing as a function of time during which a shift operation is performed for preventing the hydraulic pressure from being lowered excessively to avoid a shift shock due to the shift operation for an extended time or deterioration in the performance of the automatic transmission due to excessive slippage of the frictional elements.

The above prior art hydraulic control system, designed to prevent the hydraulic pressure from being decreased excessively during a shift operation, however, has a problem in that the hydraulic pressure is not always controlled moderately during the shift operation.

Specifically, a drive train of an automotive vehicle usually has a resonance point in a frequency range of 5 to 10 Hz. Thus, if a hydraulic control operation having frequency components more than or equal to that frequency range is carried out during shifting, it may become a vibration source causing the torque transmitted through a drive train to vibrate. In a typical feedback hydraulic control (e.g., PID (proportion-integration-differentiation) control), since the degree of control is determined according to the relation between an input value and a target value, a change in hydraulic pressure having a resonance frequency may occur, thereby generating undesirable mechanical vibrations.

Since the above problem is also encountered in a relatively high pressure range, it is difficult to alleviate the problem only by controlling the minimum pressure level as discussed above.

A gear shift in a lower range of engine torque is usually achieved in a lower range of vehicle speed. Thus, a difference between speeds of an input shaft of the automatic transmission before and after gear shifting becomes relatively small. Since a response rate of a hydraulic control system is constant, the resulting time during which feedback control can be performed effectively is decreased.

For the above reasons, it is difficult to secure the follow-up of the feedback control, especially within a lower range of the engine torque. The resulting irregular hydraulic control during the shift operation thereby causes the shift quality to be degraded.

SUMMARY OF THE INVENTION

It is therefore a principal object of the present invention to avoid the disadvantages of the prior art.

It is another object of the present invention to provide a hydraulic control system for an automatic transmission which is designed to eliminate a shift shock generated during feedback control of hydraulic pressure supplied to the automatic transmission.

According to one aspect of the present invention, there is provided a hydraulic control system for an automatic transmission which comprises a hydraulic pressure supplying unit which supplies hydraulic pressure to frictional elements of an automatic transmission to establish engagement of the frictional elements so that torque transmission is achieved through a drive train connecting an input shaft and an output shaft of the automatic transmission, a feedback hydraulic controller which controls the hydraulic pressure supplied to the frictional elements of the automatic transmission under feedback control during a shift operation for adjusting a speed of the input shaft or a rate of change in speed of the input shaft to agree with a target speed or a target rate, and a hydraulic correcting unit for correcting an output of the feedback hydraulic controller so as to suppress vibrations of torque transmitted through the drive train of the automatic transmission caused by control of the hydraulic pressure carried out by the feedback hydraulic controller within a range of a resonance frequency of the drive train of the automatic transmission.

In the preferred mode of the invention, the hydraulic correcting unit corrects the output of the feedback hydraulic controller so as to eliminate the range of the resonance frequency of the drive train of the automatic transmission.

The hydraulic correcting unit includes a low-pass filter which removes frequency components of the output of the feedback hydraulic controller higher than a given value.

The hydraulic correcting unit may provide the hysteresis to the output of the feedback hydraulic controller.

The hydraulic correcting unit may alternatively provide a dead band to the output of the feedback hydraulic controller.

According to another aspect of the invention, there is provided a hydraulic control system for an automatic transmission which comprises a hydraulic pressure supplying unit which supplies hydraulic pressure to frictional elements of an automatic transmission to establish engagement of the frictional elements for achieving torque transmission through a drive train connecting between an input shaft and an output shaft of the automatic transmission, a feedback hydraulic controller which controls the hydraulic pressure supplied to the frictional elements of the automatic transmission under feedback control during a shift operation for adjusting a speed of the input shaft or a rate of change in speed of the input shaft to agree with a target speed or a target rate, and a gain correcting unit which corrects a control gain of the feedback hydraulic controller according to a given parameter associated with torque of the input shaft of the automatic transmission.

In the preferred mode of the invention, the gain correcting unit increases the control gain as the given parameter is decreased.

The given parameter indicates a torque of an engine connected to the input shaft of the automatic transmission or an opening degree of a throttle valve of the engine.

BRIEF DESCRIPTION OF THE DRAWINGS

The present invention will be understood more fully from the detailed description given hereinbelow and from the accompanying drawings of the preferred embodiment of the invention. However, the following description should not be taken to limit the invention to the specific embodiment but are for explanation and understanding only.

In the drawings.

DESCRIPTION OF THE PREFERRED EMBODIMENT

Figure 1:
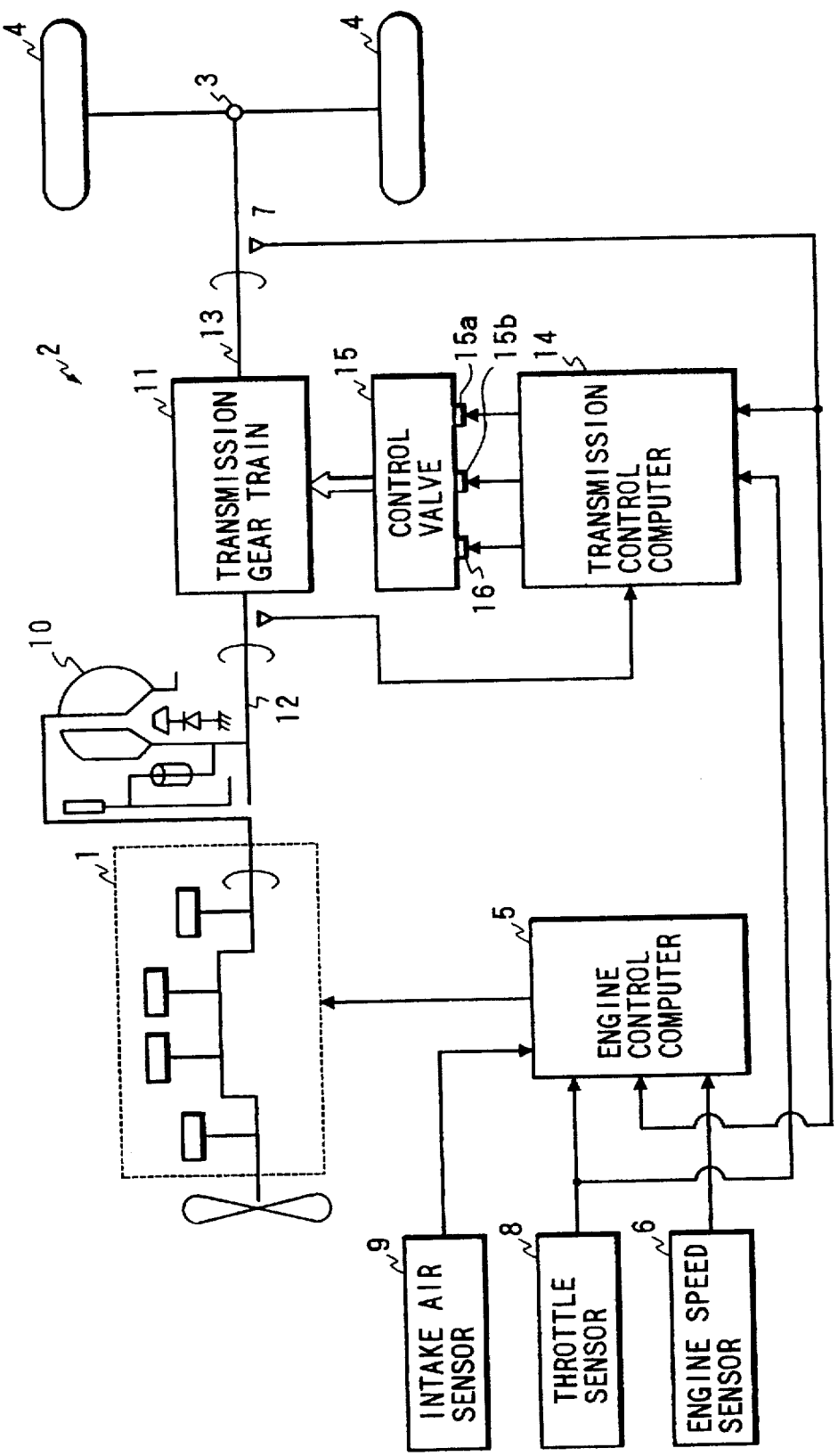
FIG. 1 is a block diagram which shows an automatic transmission control system according to the present invention.

Referring now to the drawings, particularly to FIG. 1, there is shown an automatic transmission control system incorporating therein a hydraulic control unit for an automatic transmission of an automotive vehicle.

The automatic transmission control system generally includes an engine control computer 5, a transmission control computer 14, and a hydraulic control valve unit 15.

An internal combustion engine 1 is mounted in the automotive vehicle and controlled electrically to provide power to driven wheels 4 through an automatic transmission 2 and a differential gear 3.

The automatic transmission control system also includes an engine speed sensor 6, a vehicle speed sensor 7, a throttle sensor 8, and an intake air sensor 9. The engine speed sensor 6 measures the speed of the engine 1 and provides a signal indicative thereof to the engine control computer 5. The vehicle speed sensor 7 measures the speed of an output shaft 13 of the automatic transmission 2 and provides a signal indicative thereof to the engine control computer 5. The throttle sensor 8 measures the opening degree of a throttle valve of the engine 1 and provides a signal indicative thereof to the engine control computer 5. The intake air sensor 9 measures the volume of intake air and provides a signal indicative thereof to the engine control computer 5.

The engine control computer 5 uses these sensor signals to determine the amount of fuel to be injected and provides a fuel injection control signal and an ignition signal to the engine 1. A fuel supply system and an ignition system (not shown) are responsive to these signals to supply the fuel to the engine 1 and to control combustion of the engine 1 according to the speed of the engine 1.

Figure 2:
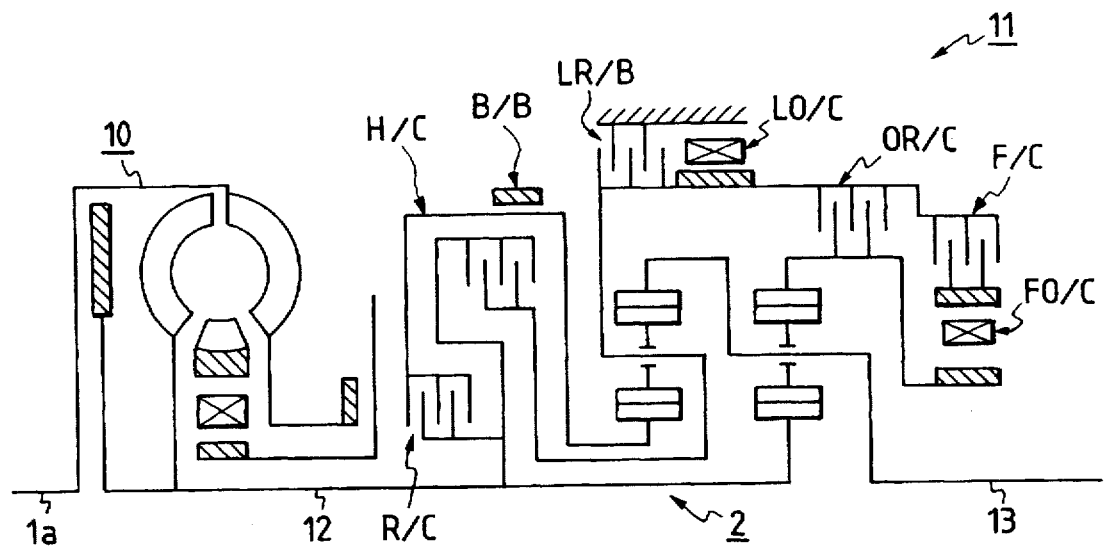
FIG. 2 is a schematic illustration which shows an automatic transmission.

The automatic transmission 2 includes a torque converter 10 and a transmission gear train 11. The power from the engine 1 is transmitted to an input shaft 12 of the transmission gear train 11, as shown in FIG. 2, through an engine output shaft 1a and the torque converter 10. The speed of the input shaft 12 changes according to a gear ratio set in the transmission gear train 11 and then transmitted to the driven wheels 4 through the output shaft 13 and the differential gear 3 for moving the vehicle.

The automatic transmission 2 is of a conventional type, as shown in FIG. 2, and explanation thereof in detail will be omitted here. In brief, the transmission gear train 11 includes a plurality of frictional elements such as clutches (a reverse clutch (R/C), a high clutch (H/C), a lower one-way clutch (LO/C), an overrun clutch (OR/C), a forward clutch (F/C), and a forward one-way clutch (FO/C)) and brakes (a band brake (B/B), and a low reverse brake (LR/B)).

The hydraulic control valve unit 15 is, as shown in FIG. 1, connected to the transmission gear train 11 and actuated by the transmission control computer 14 to provide hydraulic pressure or line pressure to the frictional elements of the transmission gear train 11 for achieving a desired gear shift.

The hydraulic control valve unit 15 includes two solenoids 15a and 15b for switching hydraulic lines according to a selected speed and a line pressure control solenoid 16 for controlling the degree of line pressure in response to a command from the transmission control computer 14. The solenoids 15a and 15b may alternatively be replaced with three or more solenoids according to the number of speeds of the automatic transmission 2 and an internal structure of the hydraulic control valve unit 15. An additional solenoid may also be provided for controlling timing of charge and discharge of the hydraulic pressure into and from the automatic transmission 2 during a transition period of time where a gear shift is achieved. The line pressure control solenoid 16 will be referred to below as including a duty solenoid, however, may alternatively be replaced with any other similar device designed to regulate the hydraulic pressure such as a linear solenoid.

The transmission control computer 14 includes a microcomputer consisting of a CPU, a ROM, a RAM, and an I/O device (not shown) and receives a sensor signal from an input shaft speed sensor 17 indicating the speed of the input shaft 12 of the automatic transmission 2 in addition to the sensor signals from the vehicle speed sensor 7 and the throttle sensor 8.

Figure 3:
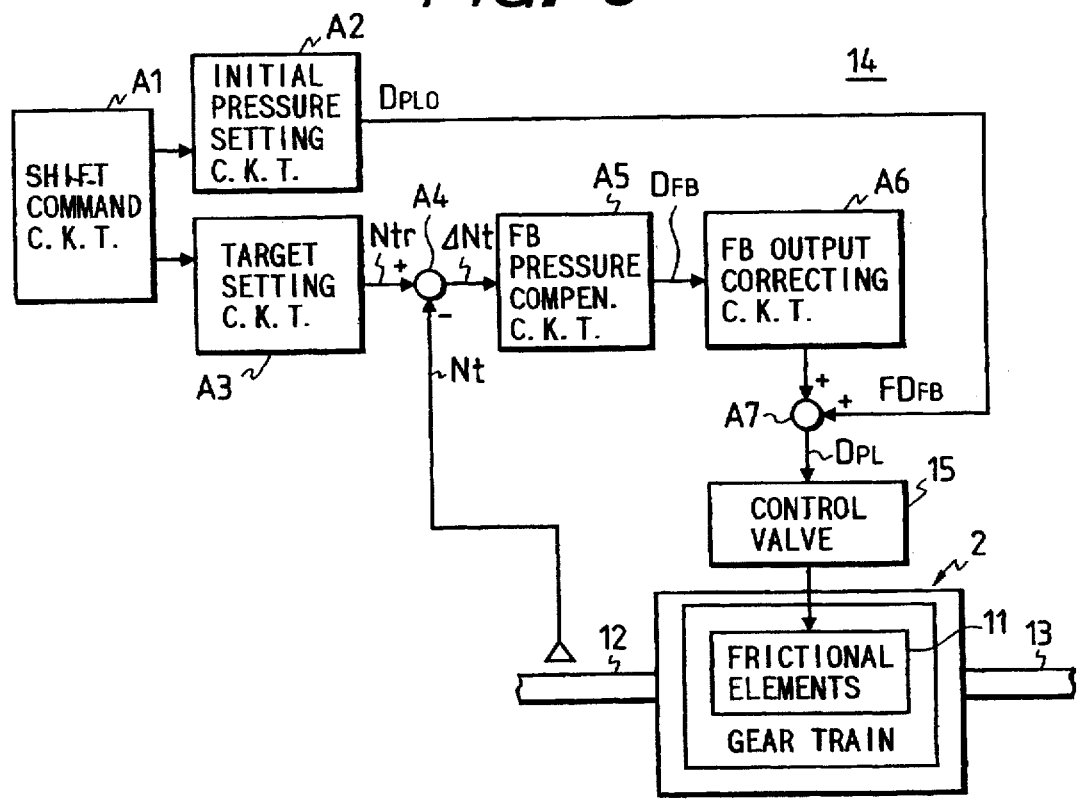
FIG. 3 is a circuit diagram which shows a transmission control computer of an automatic transmission control system of the first embodiment.

The transmission control computer 14, as shown in FIG. 3, includes a gear shift command circuit A1, an initial pressure setting circuit A2, a target setting circuit A3, a subtractor A4, an FB (feedback) pressure compensating circuit A5, an FB output correcting circuit A6, and an adder A7.

The gear shift command circuit A1 provides shift command signals to the initial pressure setting circuit A2 and the target setting circuit A3.

The initial pressure setting circuit A2 is responsive to the shift command signal from the gear shift command circuit A1 to provide a basic initial hydraulic pressure value $D_{PLO}$ based on a selected shift position. The target setting circuit A3 is responsive to the signal from the gear shift command circuit A1 to determine a target input shaft speed (or a target gradient or rate of change in input shaft speed) Ntr.

The subtractor A4 subtracts an actual speed Nt of the input shaft 12 from the target input shaft speed Ntr to derive a difference $\Delta Nt$.

The FB pressure compensating circuit A5 is designed to perform the known PID control or PD control and receives the difference $\Delta Nt$ from the subtractor A4 to determine controlled pressure (i.e., an FB compensating pressure value) $D_{BF}$ for decreasing the difference $\Delta Nt$.

The FB output correcting circuit A6 receives the FB compensating pressure value $D_{FB}$ from the FB pressure compensating circuit A5 and passes it through a low-pass filter to provide a corrected FB compensating pressure value $FD_{FB}$.

The adder A7 adds the initial hydraulic pressure value $D_{PLO}$ and the corrected FB compensating pressure value $FD_{FB}$ low-pass filtered by the output correcting circuit A6 to provide a line pressure control signal $D_{PL}$ to the automatic transmission 2.

Figure 4:
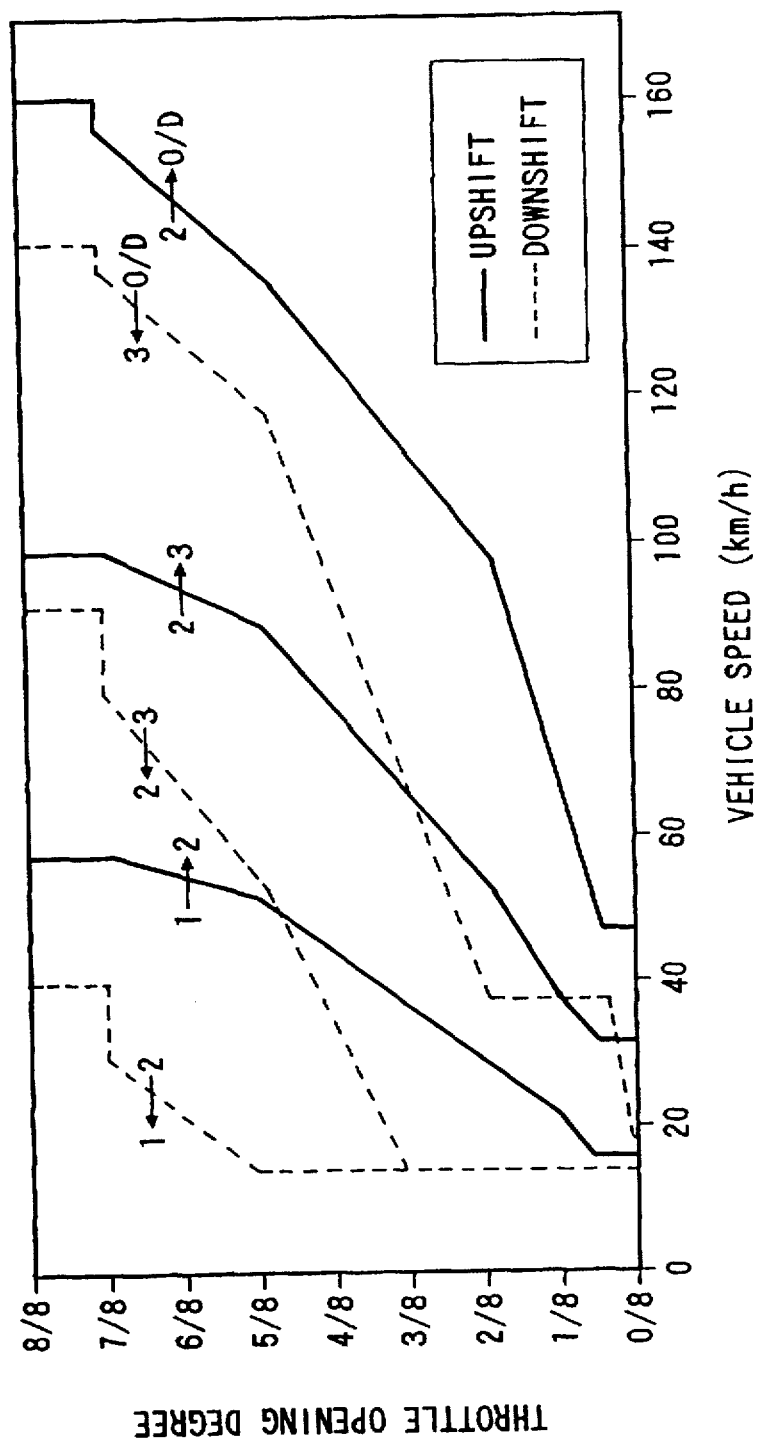
FIG. 4 is a chart illustrating used in a shift operation of an automatic transmission.

In operation, the transmission control computer 14 determines which of speed zones of a shift diagram, as shown in FIG. 4, a current traveling condition corresponds to using the sensor signals from the vehicle speed sensor 7 and the throttle sensor 8 to select a proper gear ratio. The shift diagram is predetermined according to the relation between the opening degree of the throttle valve and the vehicle speed. The speed zones are defined by different lines in upshift and downshift operations for avoiding the chattering upon determination of the gear ratio. Specifically, upon the upshift from nth speed (n=1, 2, and 3) to (n+1)th speed, the speed zones are defined by solid lines, while upon the downshift from mth speed (m=2, 3, and 4) to (m−1) th speed, they are defined by broken lines.

The transmission control computer 14 then controls on/off operations of the speed control solenoids 15a and 15b according to an operational schedule as shown in the table 1 below for establishing the selected gear ratio.

TABLE 1

| speed | solenoid 15a | solenoid 15b |
|---|---|---|
| 1st | ON | OFF |
| 2nd | ON | ON |
| 3rd | OFF | ON |
| 4th | OFF | OFF |

According to the above on/off operations of the speed control solenoids 15a and 15b, the hydraulic control valve unit 15 provides a given hydraulic pressure to selected ones of the frictional elements of the transmission gear train 11 to establish a selected speed.

The transmission control computer 14 also controls the line pressure control solenoid 16 in a manner as described below.

Figure 5A:
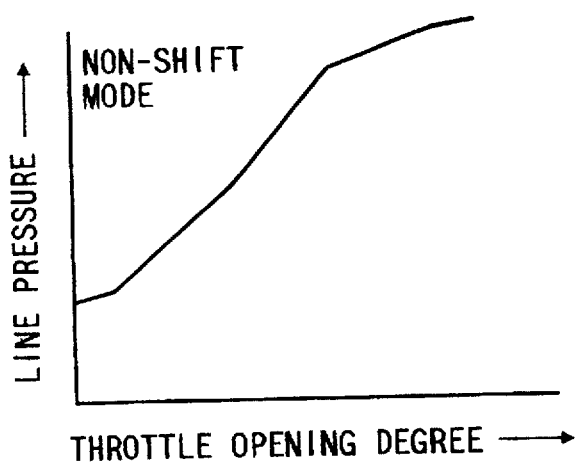
FIG. 5(a) is a chart which shows the relation between a line pressure and an opening degree of a throttle valve.
Figure 5B:
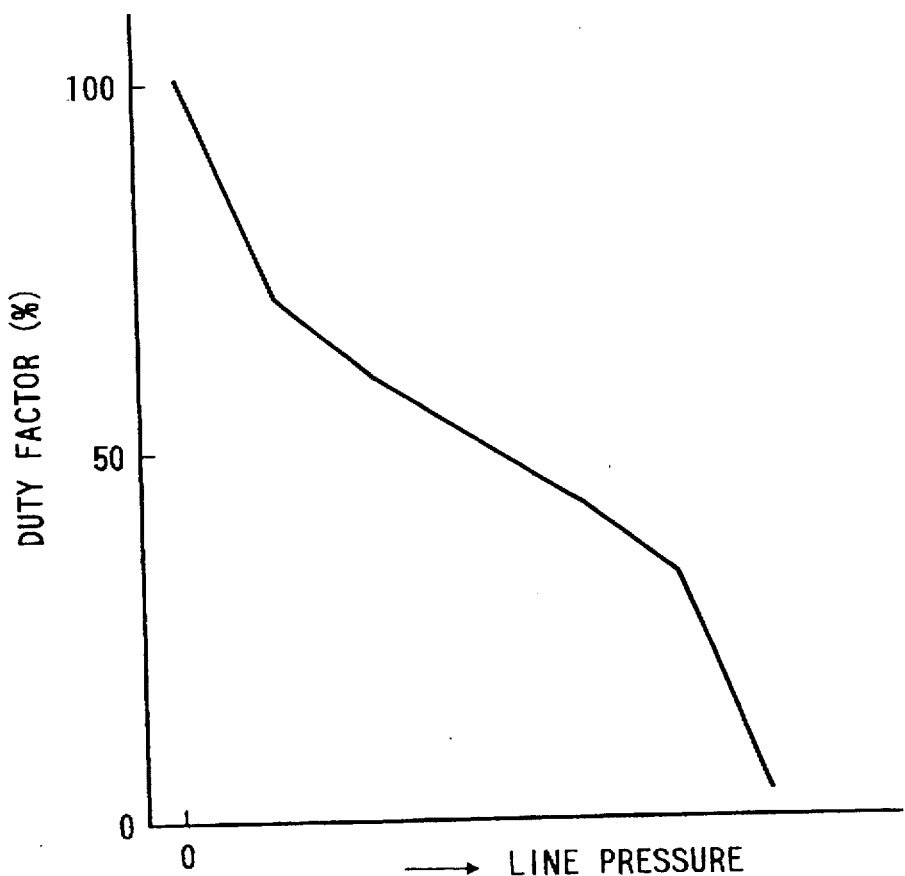
FIG. 5(b) is a chart which shows the relation between a duty factor of a control signal for a control valve and a line pressure.

When it is not required to change a gear ratio, the hydraulic pressure (i.e., line pressure), as shown in FIG. 5(a), is provided based on the opening degree of the throttle valve. In practice, a desired line pressure is first determined by look-up using a map shown in FIG. 5(a) based on the sensor signal from the throttle sensor 8. Next, the determined line pressure is converted into a duty factor of a control signal for actuating the line pressure control solenoid 16 by look-up using a map as shown in FIG. 5(b) for developing the desired line pressure. The maps in FIGS. 5(a) and 5(b) may be combined so that the duty factor can be determined directly based on an opening degree of the throttle valve.

When it is required to change a gear ratio according to the shift diagram shown in FIG. 4, the on/off operations of the speed control solenoids 15a and 15b are controlled, and the line pressure is changed for reducing a shift shock.

The operation of changing the line pressure, for example, when an upshift is achieved will be discussed below.

Figure 6:
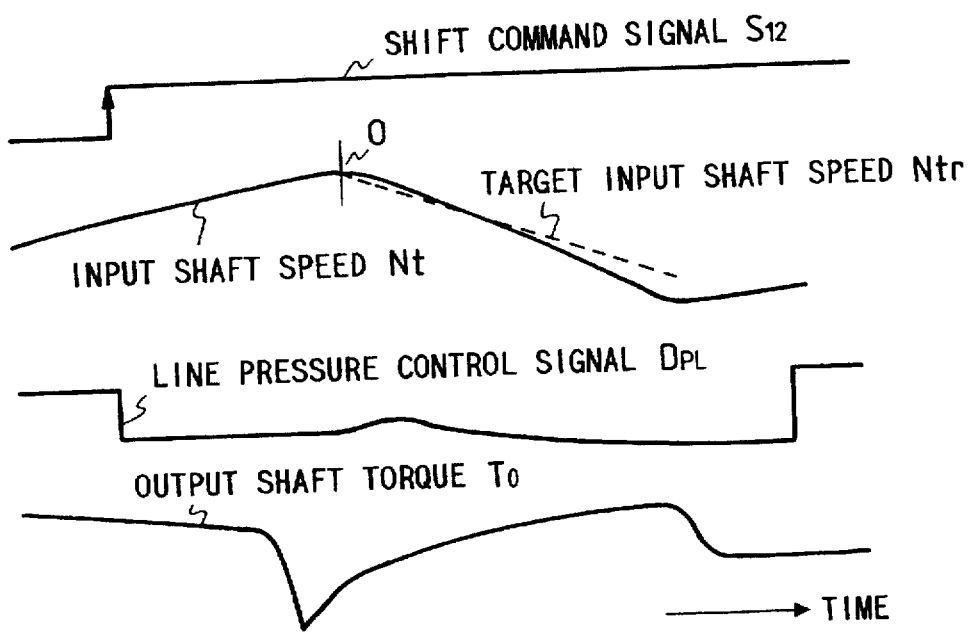
FIG. 6 is a time chart which shows variations in shift command signal S12, input shaft speed Nt, target input shaft speed Ntr, line pressure control signal DPL, and output shaft torque To when a shift operation is performed.

The line pressure is, as shown in FIG. 6, feedback-controlled from an initial pressure determined based on a selected gear ratio, an opening degree of the throttle valve, an output torque of the engine 1, or the torque of the input shaft 12 so as to establish a change in speed of the input shaft 12 corresponding to a given change in torque of the output shaft 13.

Specifically, when a shift command signal S12 is outputted by the gear shift command circuit A1, the line pressure control signal $D_{PL}$ is outputted by the adder A7 for generating the line pressure Pi corresponding to the engine torque. Subsequently, upon engagement of the frictional elements of the transmission gear train 11, the input shaft speed Nt is decreased from a point "O" at a rate determined by the degree of engagement of the frictional elements so that a gear shift is achieved.

The transmission control computer 14 detects the point "O" to determine the target input shaft speed Ntr through the target setting circuit A3. The FB pressure compensating circuit A5 then performs a known FB (feedback) operation according to an equation (1) below based on the difference $\Delta Nt$ between the target input shaft speed Ntr and the actual input shaft speed Nt.

$$\Delta Nt(n) = Ntr(n) - Nt(n) \quad (1)$$

For example, in the PID control, the FB compensating pressure value DFB is determined according to an equation (2) below.

$$DFB(n) = KP \cdot \Delta Nt(n) + KI \cdot \sum_{k=0}^{n} \Delta Nt(k) + KD \cdot (\Delta Nt(n) - \Delta Nt(n-1)) \quad (2)$$

where (n) indicates a current input or output, (n–1) indicates a value one sampling cycle earlier, and KP, KI, and KD indicate a P (proportional) gain, an I (integral) gain, and a D (differential) gain, respectively.

The above FB operation may alternatively be performed only using the PD, PI, and P control systems or any other system in a different control theory.

In a conventional system, the FB compensating pressure value DFB is added to the initial hydraulic pressure value DPLO outputted from the initial pressure setting circuit A2, as shown in an equation (3) below, to provide the line pressure control signal; however, the automatic transmission control system of this invention corrects, as will be described below, the FB compensating pressure value DBF prior to calculating the equation (3).

$$DPL = DPLO + DFB \quad (3)$$

For example, if detection of start of a gear shift is delayed, it will cause the FB (feedback) control to be initiated at a time when the input shaft speed Nt is shifted greatly from the target input shaft speed Ntr. The FB pressure compensating circuit A5, thus, provides the FB compensating pressure value DBF to have the input shaft speed Nt agree with the target input shaft speed Ntr quickly.

Figure 7:
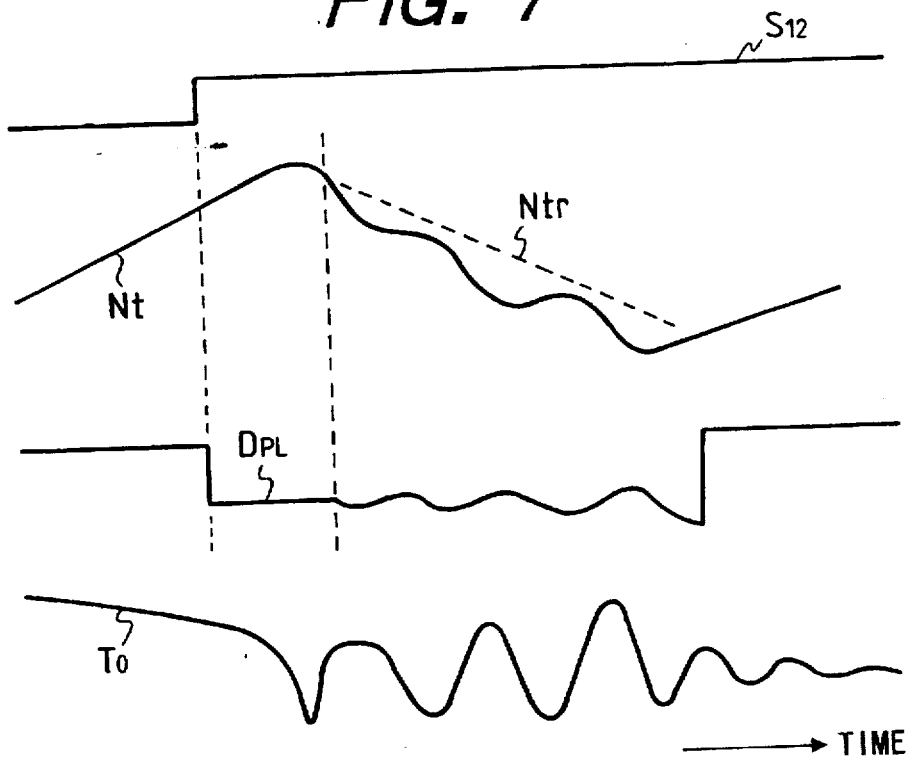
FIG. 7 is a time chart which shows vibration of torque of an output shaft of an automatic transmission.

However, in this case, the delay in response of operations of a hydraulic control system and mechanical components of the vehicle causes an excessive pressure to be developed which changes the input shaft speed Nt cyclically across the target input shaft speed Ntr, resulting in mechanical vibrations of the output shaft 13. This generates uncomfortable shifting shocks, as shown in FIG. 7.

For avoiding the above drawback, the transmission control system of this invention has the FB output correcting circuit A6 consisting of a low-pass filter following the FB pressure compensating circuit A5.

Figure 8A:
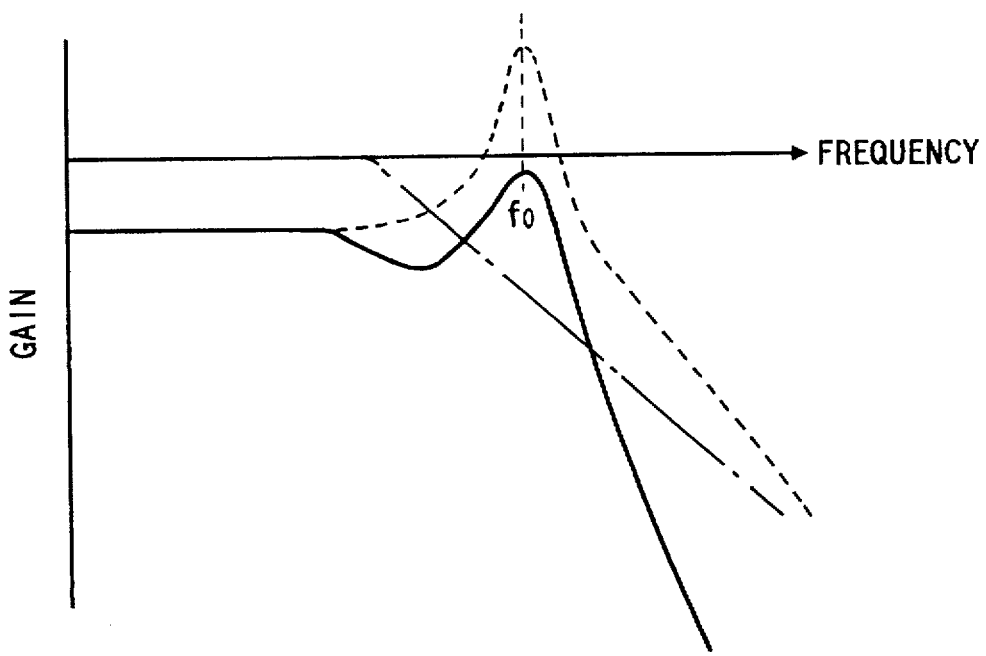
FIGS. 8(a) to 8(c) are explanatory diagrams showing the principle of the first embodiment.
Figure 8B:
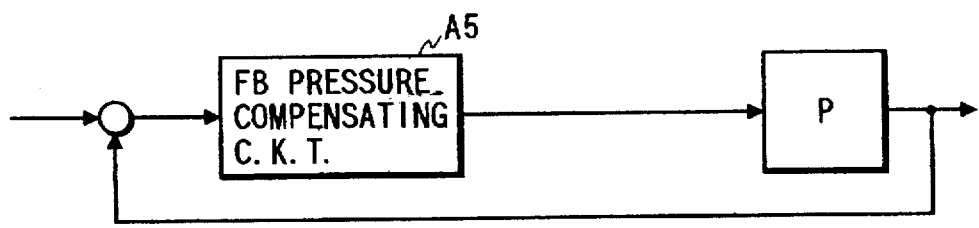

Generally, frequency characteristics of the open-loop transfer function of a loop, as shown in FIG. 8(b), consisting of a feedback control system (i.e., the FB pressure compensating circuit A5) and a drive system P without the FB output correcting circuit A6 have a resonance point at a frequency f0, as shown by a broken line in FIG. 8(a).

Figure 8C:
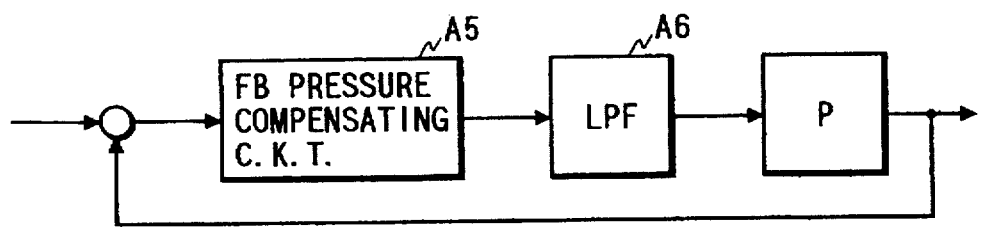

A control system consisting of the FB pressure compensating circuit A5, a low-pass filter (i.e., the FB output correcting circuit A6), and the drive system P, as shown in FIG. 8(c), assumes frequency characteristics indicated by a solid line in FIG. 8(a). With these arrangements, a loop gain becomes one or less throughout a frequency range. This compensates for stability of the control system in theory.

Figure 9:
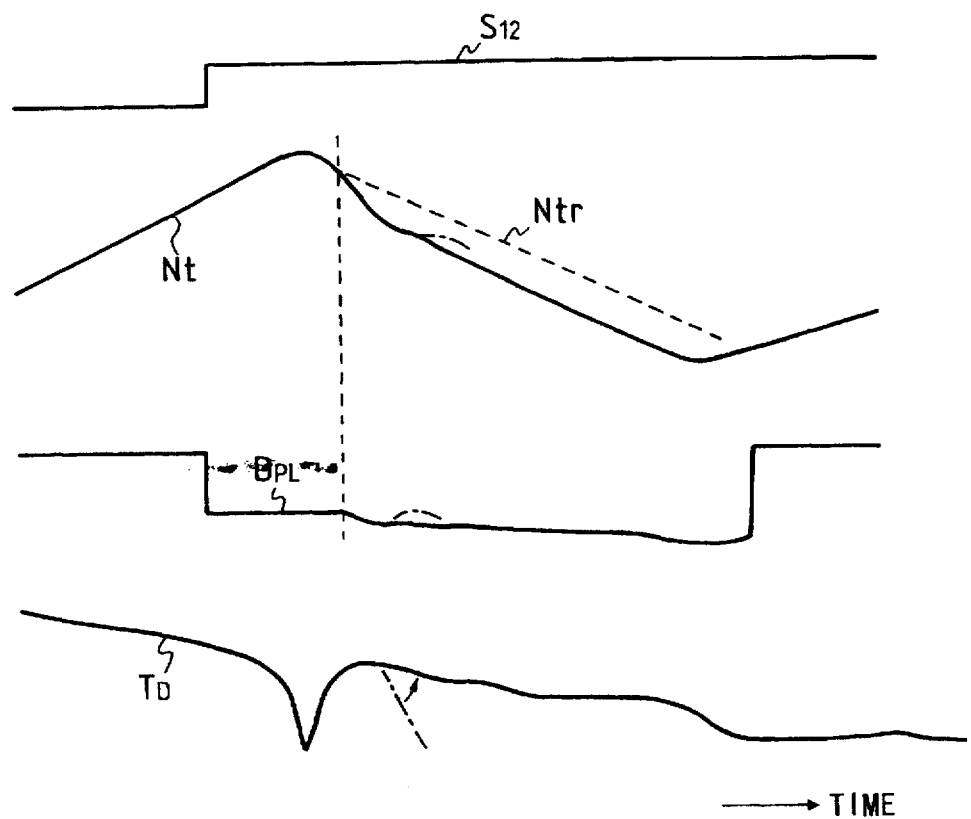
FIG. 9 is a time chart which shows variations in shift command signal S12, input shaft speed Nt, target input shaft speed Ntr, line pressure control signal DPL, and output shaft torque To in the first embodiment when a shift operation is performed.

Waveforms of the shift command signal S12 outputted from the gear shift command circuit A1, the input shaft speed Nt, the line pressure control signal DPL, and the output shaft torque To in the transmission control system of this invention are shown in FIG. 9. As can be seen in the drawing, a quick variation in the line pressure control signal DPL, as shown by a broken line, is eliminated, resulting in reduction in vibrations, as shown by broken lines, of the input shaft speed Nt and the output shaft torque To to achieve a stable shift operation.

FIGS. 10 to 14 shows flowcharts of programs or sequence of logical steps performed by the transmission control computer 14.

Figure 10:
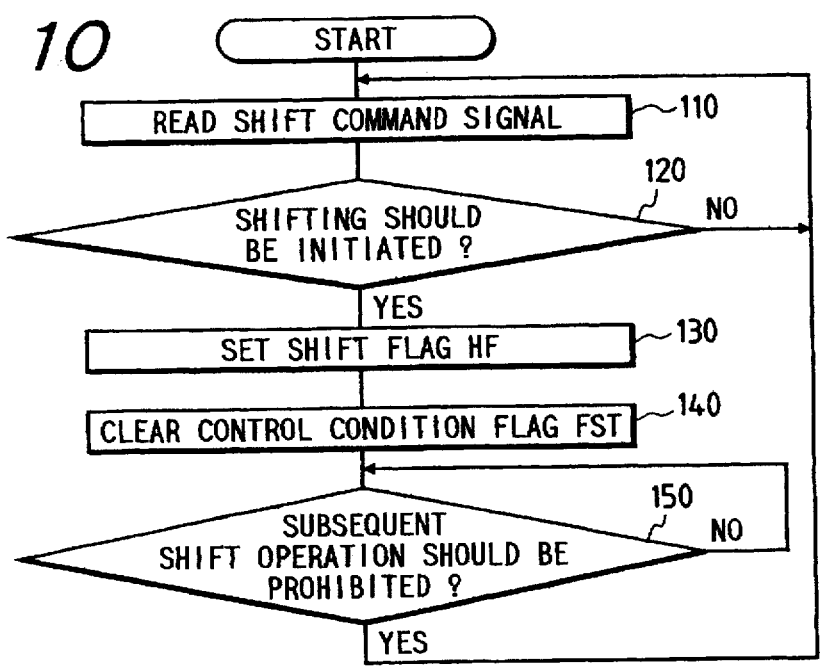
FIGS. 10 to 14 are flowcharts of hydraulic control programs performed by a transmission control computer of the first embodiment.

After entering the program shown in FIG. 10, the routine proceeds to step 110 wherein the shift command signal S12 is read out.

The routine then proceeds to step 120 wherein it is determined whether shifting control should be performed or not based on the shift command signal.

If a NO answer is obtained, then the routine returns back to step 110. Alternatively, if a YES answer is obtained, then the routine proceeds to step 130 wherein a shift flag HF indicating the initiation of the shifting operation is set to one (1).

The routine then proceeds to step 140 wherein a control condition flag FST indicating a shift control condition is cleared (FST←0).

The routine then proceeds to step 150 wherein it is determined whether a subsequent shifting operation, if commanded, should be prohibited or not for a given period of time until the current shifting operation is completed. If a YES answer is obtained, the subsequent shifting operation is prohibited for the given period of time, and the routine returns back to step 110.

Figure 11:
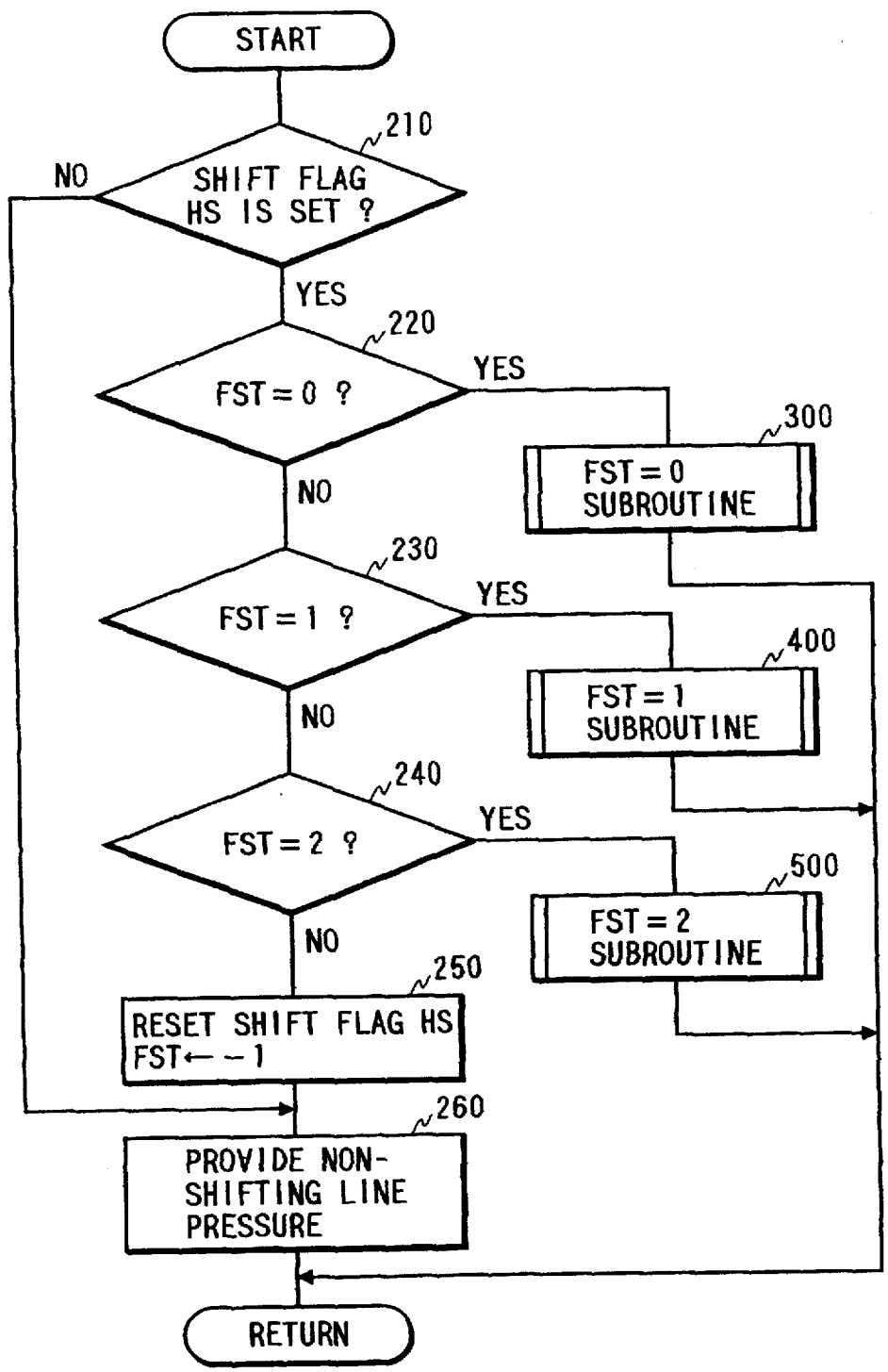

A subroutine according to the status of the control condition flag FST will be discussed with reference to FIG. 11. This routine is also performed in given cycles.

In step 210, it is determined whether the shift flag HF is set to one (1) or not. If a NO answer is obtained, then the routine proceeds directly to step 260 wherein since the operation of the transmission control computer 14 is out of the shifting control, a given line pressure not for gear shifting is provided and then terminates.

If a YES answer is obtained in step 210, then the routine proceeds to step 220 wherein it is determined whether the control condition flag FST is zero (0) or not. If a YES answer is obtained, then the routine proceeds to step 300, as will be described later in detail, and terminates. Alternatively, if a NO answer is obtained, then the routine proceeds to step 230 wherein it is determined whether the control condition flag FST is one (1) or not. If a YES answer is obtained, then the routine proceeds to step 400, as will be described later in detail, and terminates. Alternatively, if a NO answer is obtained, then the routine proceeds to step 240 wherein it is determined whether the control condition flag FST is two (2) or not. If a YES answer is obtained, then the routine proceeds to step 500, as will be described later in detail, and terminates. Alternatively, if a NO answer is obtained, then the routine proceeds to step 250.

In step 250, since the shifting control is completed, the shift flag HF is reset, and the control condition flag FST is set to −1. The routine then terminates through step 260.

Figure 12:
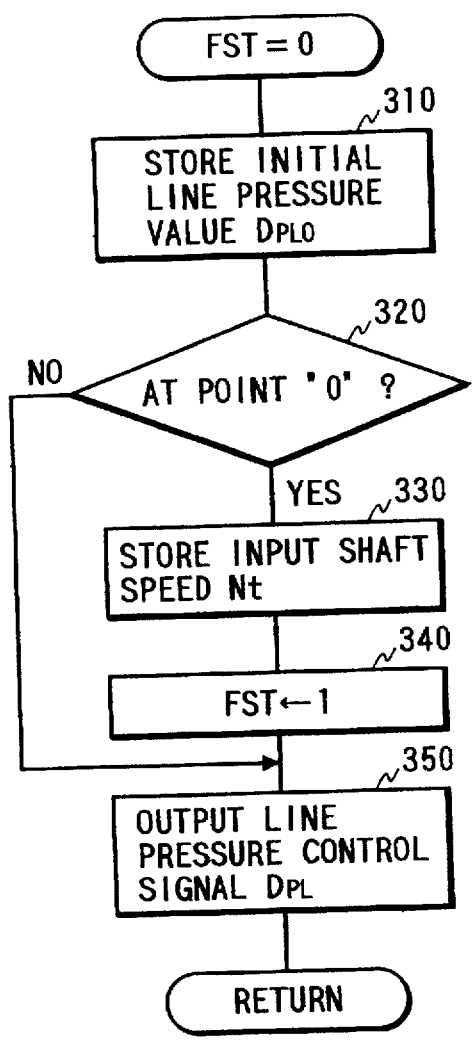

A subroutine in step 300 will be described with reference to the flowchart in FIG. 12.

In step 310, the initial hydraulic pressure (i.e., an initial line pressure value) DPLO is stored in a memory which is determined according to a current shifting condition such as a shift position.

The routine then proceeds to step 320 wherein the behavior of the shifting operation is determined. Specifically, it is determined whether the input shaft speed Nt is at the point "O" (i.e., an actually shifting start point) shown in FIG. 6 or not by monitoring a change in the input shaft speed Nt. If a YES answer is obtained, then the routine proceeds to step 330. Alternatively, if a NO answer is obtained, then the routine proceeds directly to step 350.

In step 330, the input shaft speed Nt is stored in the memory.

The routine then proceeds to step 340 wherein the line pressure control signal DPL is outputted from the adder A7 and terminates.

A subroutine in step 400 will be described below with reference to FIG. 13.

In step 410, the target input shaft speed Ntr is determined according to a shift condition using an equation (4) below. Note that this embodiment shows an example wherein a target value is reached at a constant gradient or rate.

$$Ntr(n)=Ntr(n-1)+\Delta T \cdot dNtr \qquad (4)$$

where $\Delta T$ is a cycle time during which this routine is performed, and dNtr is a change in speed corresponding to a preselected target gradient.

The routine then proceeds to step 420 wherein the FB compensating pressure value DFB is determined according to the above equations (1) to (3).

The routine then proceeds to step 430 wherein the FB compensating pressure value DBF determined in step 420 is corrected through the low-pass filter in the FB output correcting circuit A6 to provide the corrected FB compensating pressure value FDFB. One example of correcting the FB compensating pressure DFB is shown by the following equation (5).

$$FD_{FB}(n)=D_{BF} \cdot (1-d)+FD_{BF}(n-1) \cdot d \qquad (5)$$

where $d=\exp(-Ts/\tau)$, Ts is a sampling cycle, and $\tau$ is a time constant of the low-pass filter.

Note that a linear filter is used here as one example, but 2 to nth order filter may alternatively be used depending upon characteristics of a controlled object.

Subsequently, the routine proceeds to step 440 wherein it is determined whether the shift operation has been completed or not based on reversal of a rotational direction of the input shaft speed Nt. If a YES answer is obtained, then the routine proceeds to step 450. Alternatively, if a NO answer is obtained, then the routine proceeds to step 460.

In step 450, the control condition flag FST is set to two (2).

In step 460, the line pressure control signal DPL(=DPLO+ FDFB) is outputted from the adder A7, and the routine then terminates.

Figure 14:
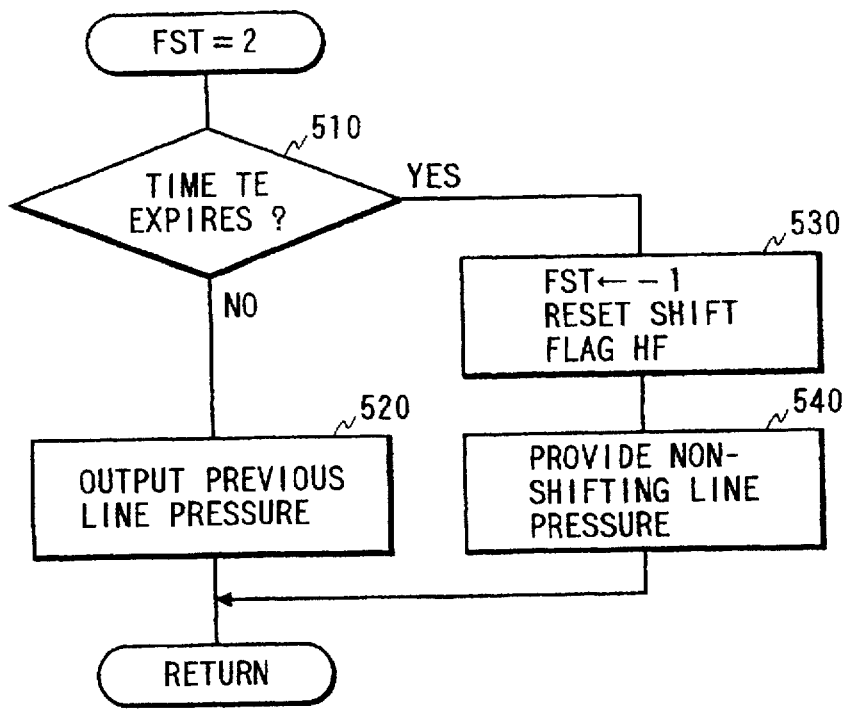

A subroutine in step 500 performed when the control condition flag FST=2 will be discussed below with reference to FIG. 14.

In step 510, it is determined whether a time TE during which the current line pressure is held for completion of the shift operation expires or not. If a YES answer is obtained, then the routine proceeds to step 530. Alternatively, if a NO answer is obtained, then the routine proceeds to step 520.

In step 520, a line pressure provided one program cycle earlier is outputted, and the routine then terminates.

In step 530, the control condition flag FST is set to –1, and the shift flag HF is reset.

The routine then proceeds to step 540 wherein a given line pressure not for gear shifting is provided and then terminates.

As discussed above, the transmission control system of this embodiment corrects the FB compensating pressure value DFB using the low-pass filter. Specifically, high frequencies above a given value is cut off using the low-pass filter having characteristics shown by a chain line in FIG. 8(a) so that the whole control system may assume frequency characteristics shown by a solid line in FIG. 8(a).

Therefore, a loop gain becomes one or less over a frequency range, thereby establishing the stability of the control system. Specifically, the vibrations of the input shaft speed Nt and the output shaft torque To are suppressed to achieve the stable FB control during a shift operation, as shown in FIG. 11, resulting in greatly improved shift quality.

The automatic transmission control system according to the second embodiment will be discussed below. The same hardware and software as those of the above first embodiment will be omitted or simply discussed here for the brevity of disclosure.

The automatic transmission control system of this embodiment is different from that of the first embodiment in that the FB output correcting circuit A6 corrects the FB compensating pressure value DBF using the hysteresis without use of a low-pass filter.

First, the principle of an operation of the FB output correcting circuit A6 will be discussed below.

Figure 15A:
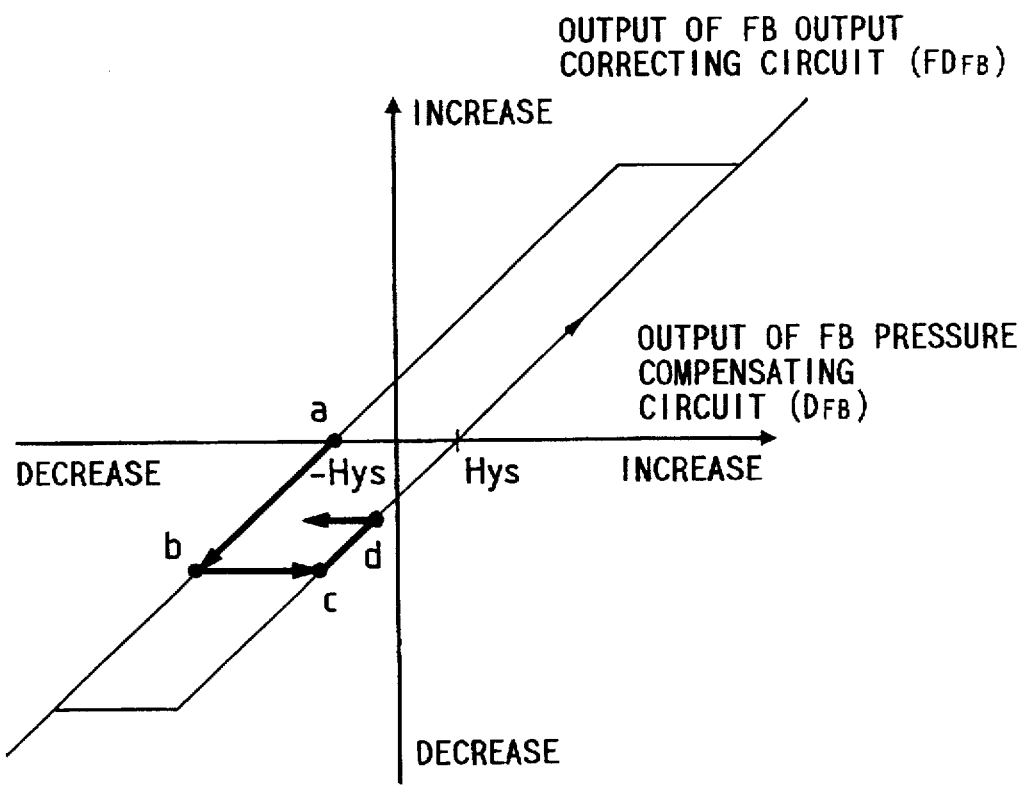
FIGS. 15(a) and 15(b) are explanatory diagrams showing the principle of the second embodiment.

The automatic transmission control system of this embodiment is so designed that the hydraulic pressure control during a shift operation is started at a point a in FIG. 15(a). When the FB pressure compensating circuit A5 issues a pressure reduction command, the FB compensating pressure value DFB changes along a thick line, and the FB output correcting circuit A6 also issues a pressure reduction command.

When the FB compensating pressure value DFB is changed at a point b in a direction of increasing the line pressure, the output of the FB output correcting circuit A6 (i.e., the corrected FB compensating pressure value FDFB) enters a hysteresis zone to maintain the line pressure constant.

When the FB compensating pressure value DFB is changed at a point d in a direction of decreasing the line pressure, the output of the FB output correcting circuit A6 enters the hysteresis zone to maintain the line pressure constant again.

Figure 15B:
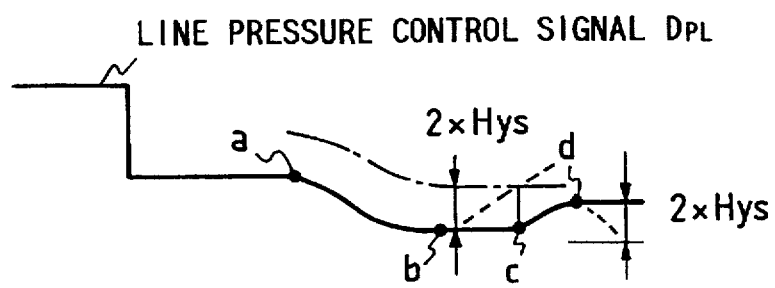

FIG. 15(b) shows a change in the line pressure control signal DPL outputted from the adder A7 over a range from the point a to d in FIG. 15(a). The output of the FB hydraulic pressure control circuit A5 shown by a broken line is changed, as described above, at the point b in the direction of increasing the line pressure, but the line pressure control signal DPL which holds a level of the line pressure at the point b is provided by the hysteresis zone.

When the output of the FB pressure compensating circuit A5 moves by the width of the hysteresis zone (=2×hys) to reach the point c, the line pressure control signal DPL begins to change.

When the point d is reached, the output of the FB pressure compensating circuit A5 is changed, as shown by a broken line, in the direction of decreasing the line pressure, but the line pressure control signal DPL holds the level of the line pressure developed at the point d.

Figure 16:
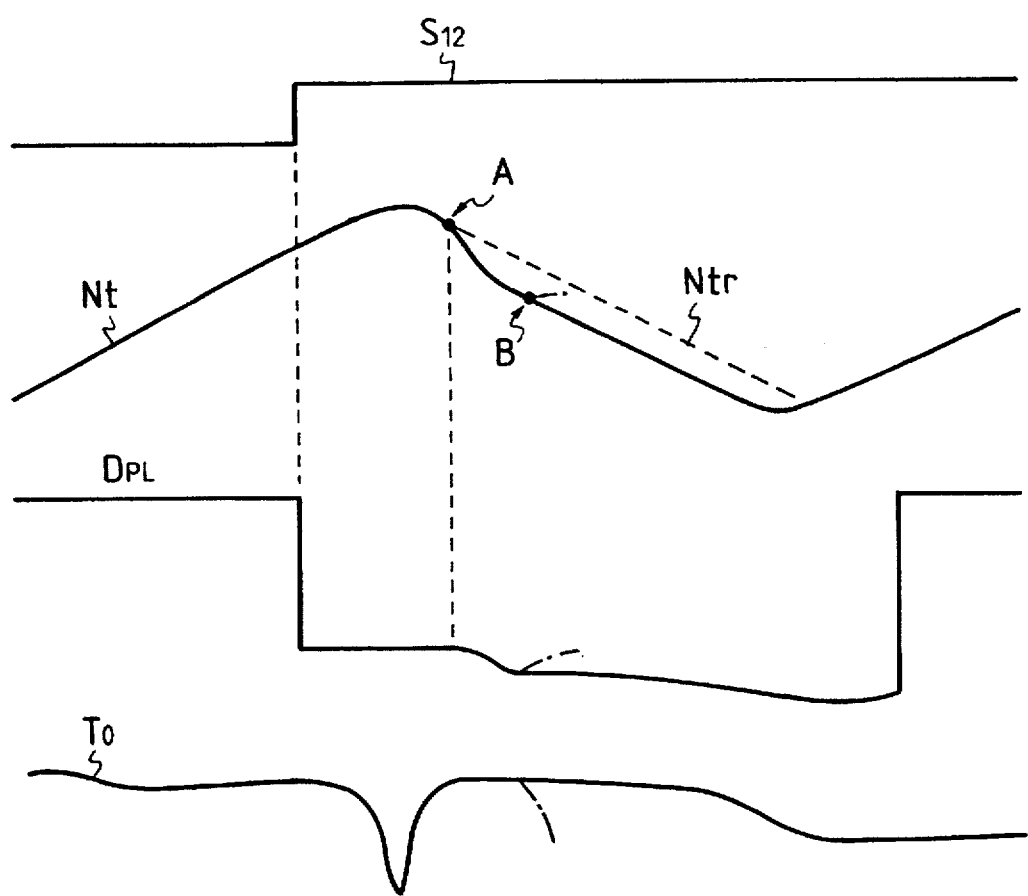
FIG. 16 is a time chart which shows variations in shift command signal S12, input shaft speed Nt, target input shaft speed Ntr, line pressure control signal DPL, and output shaft torque To in the second embodiment when a shift operation is performed.

FIG. 16 shows the relation among the shift command signal S12 outputted from the gear shift command circuit A1, the input shaft speed Nt, the line pressure control signal DPL, and the output shaft torque To. As can be seen in the drawing, the pressure reduction command is issued, as described above, at a point A at which the feedback control is started. Subsequently, a gradient or rate of change in the input shaft speed Nt is decreased near a point B. If the feedback compensation is made only through the FB pressure compensating circuit A5, the line pressure control signal DPL is changed, as shown by a chain line, in a direction of increasing the line pressure, thereby inducing the vibrations, as shown in FIG. 7 (shown by a chain line in FIG. 16).

However, in this embodiment, the output of the FB output correcting circuit A6 falls within the hysteresis zone near the point B at which the line pressure begins to increase, so that the line pressure (i.e., the line pressure control signal DPL) is held, similar to the one shown in FIG. 9. This avoids a sudden increase in the line pressure, resulting in stable hydraulic pressure control suppressing the vibrations.

Figure 17:
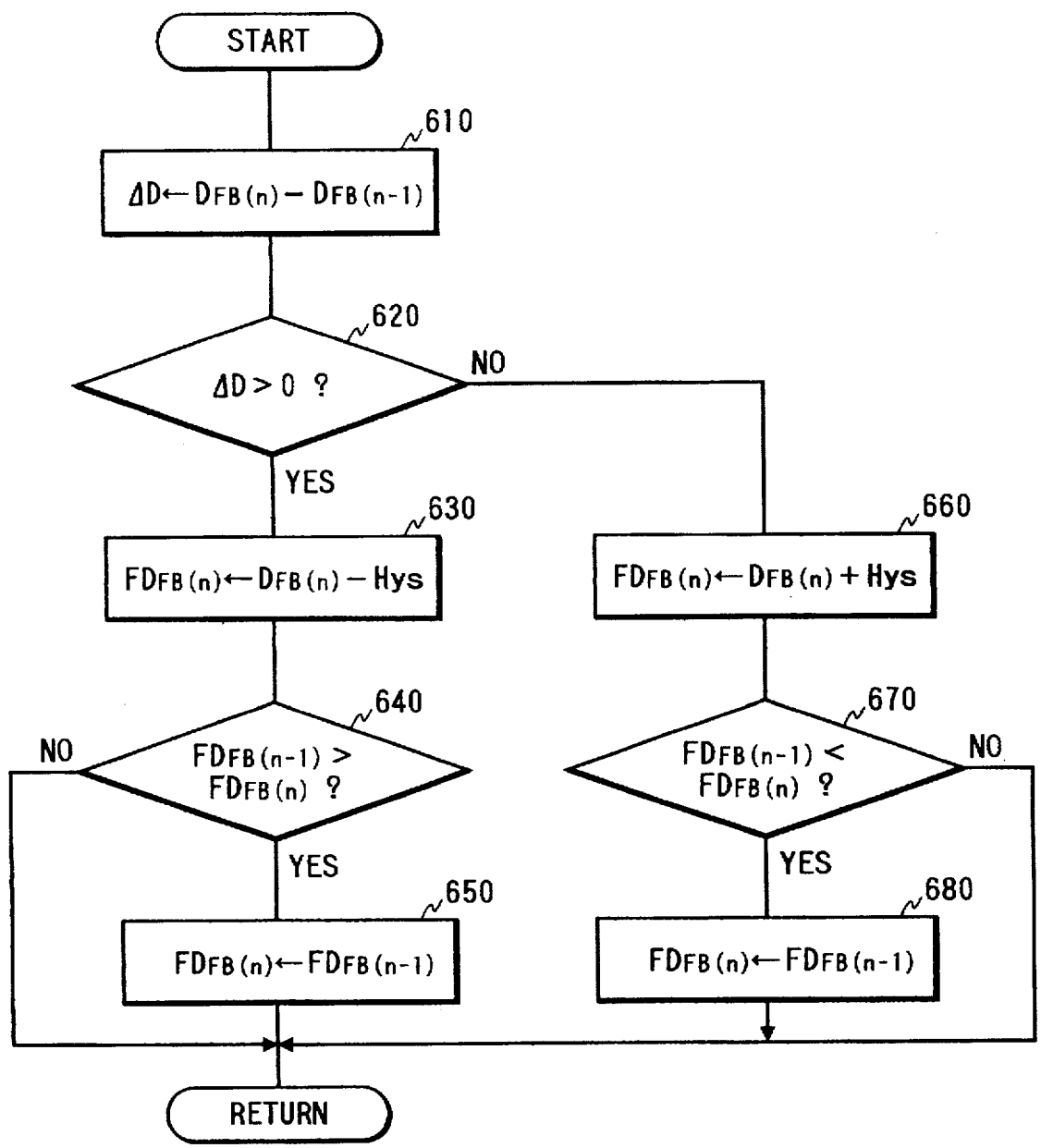
FIG. 17 is a flowchart of a program performed by a transmission control computer of the second embodiment.

An operation of this embodiment will be described below with reference to a flowchart shown in FIG. 17.

After entering the program, the routine proceeds to step 610 wherein a change in FB compensating pressure ΔD is determined based on a difference between the FB compensating pressure values DFB provided in this program cycle and one program cycle before (ΔD=DFB(n)−DFB(n−1)).

The routine proceeds to step 620 wherein it is determined whether a direction of the change in FB compensating pressure ΔD indicates the increase in line pressure or not based on the sign thereof. If a YES answer is obtained meaning that the change in FB compensating pressure ΔD indicates the increase in line pressure, then the routine proceeds to step 630. Alternatively, if a NO answer is obtained, then the routine proceeds to step 660.

Figure 18A:
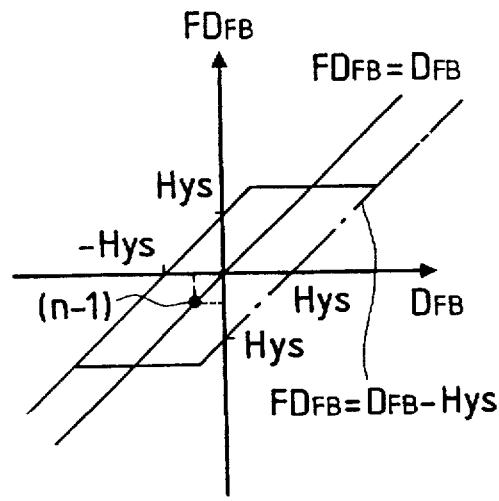
FIGS. 18(a) to 18(d) show the relations between an output of an FB pressure compensating circuit and an output of an FB output correcting circuit using the hysteresis.

In step 630, if the corrected FB compensating pressure value FDFB provided one program cycle earlier shows a value at a point as labeled "(n−1)" in FIG. 18(a), it is updated as shown by a chain line. Specifically, the corrected FB compensating pressure value FDFB outputted from the FB output correcting circuit A6 is determined according to an equation (6) below.

$$FD_{FB}(n) = D_{FB}(n) - Hys \qquad (6)$$

The routine then proceeds to step 640 wherein it is determined whether the corrected FB compensating pressure value FDFB(n−1) provided one program cycle earlier is greater than the corrected FB compensating pressure value FDFB(n) provided in this program cycle or not. If a YES answer is obtained, then the routine proceeds to step 650. Alternatively, if a NO answer is obtained, then the routine terminates.

In step 650, a value of the corrected FB compensating pressure value FDFB(n) is set to the corrected FB compensating pressure value FDFB(n−1).

Figure 18C:
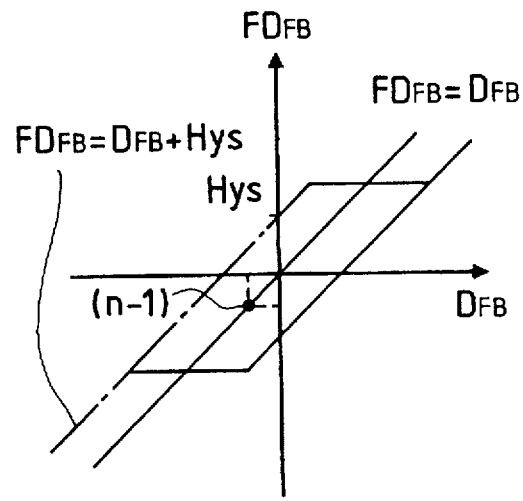
Figure 18B:
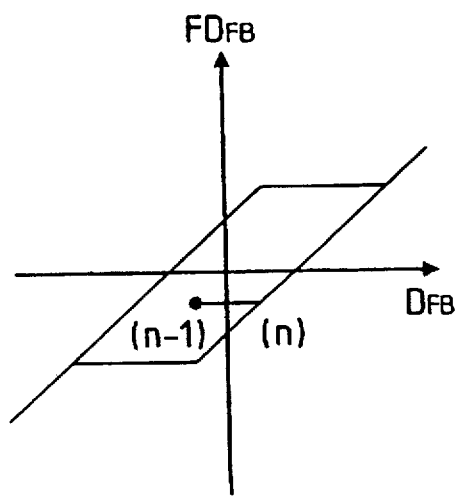

With steps 630 to 650, the FB compensating pressure value FDFB along a thick line shown in FIG. 18(b) is provided.

If a NO answer is obtained in step 620 meaning that the change in FB compensating pressure ΔD indicates the decrease in line pressure, then the routine proceeds to step 660 wherein if the corrected FB compensating pressure value FDFB provided one program cycle earlier shows a value at a point as labeled "(n−1)" in FIG. 18(c), it is updated as shown by a chain line. Specifically, the corrected FB compensating pressure value FDFB outputted from the FB output correcting circuit A6 is determined according to an equation (7) below.

$$FD_{FB}(n) = D_{FB}(n) + Hys \qquad (7)$$

The routine then proceeds to step 670 wherein it is determined whether the corrected FB compensating pressure value FDFB(n−1) provided one program cycle earlier is smaller than the corrected FB compensating pressure value FDFB(n) provided in this program cycle or not. If a YES answer is obtained, then the routine proceeds to step 680. Alternatively, if a NO answer is obtained, then the routine terminates.

In step 680, the corrected FB compensating pressure value FDFB(n) is set to the corrected FB compensating pressure value FDFB(n−1).

Figure 18D:
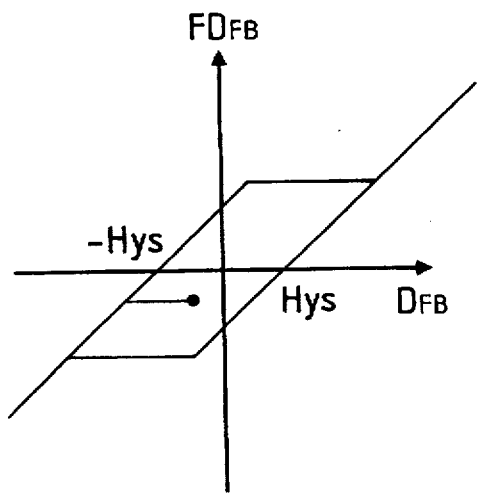

With steps 660 to 680, the FB compensating pressure value FDFB along a thick line shown in FIG. 18(d) is provided. This achieves the stable control, resulting in improved shift quality.

The automatic transmission control system according to the third embodiment will be discussed below. The same hardware and software as those of the above first embodiment will be omitted or simply discussed here for the brevity of disclosure.

The automatic transmission control system of this embodiment is different from that of the first embodiment in that the FB output correcting circuit A6 corrects the FB compensating pressure value DFB using a dead band without use of a low-pass filter.

First, the principle of an operation of the FB output correcting circuit A6 using the dead band will be discussed below.

Figure 19A:
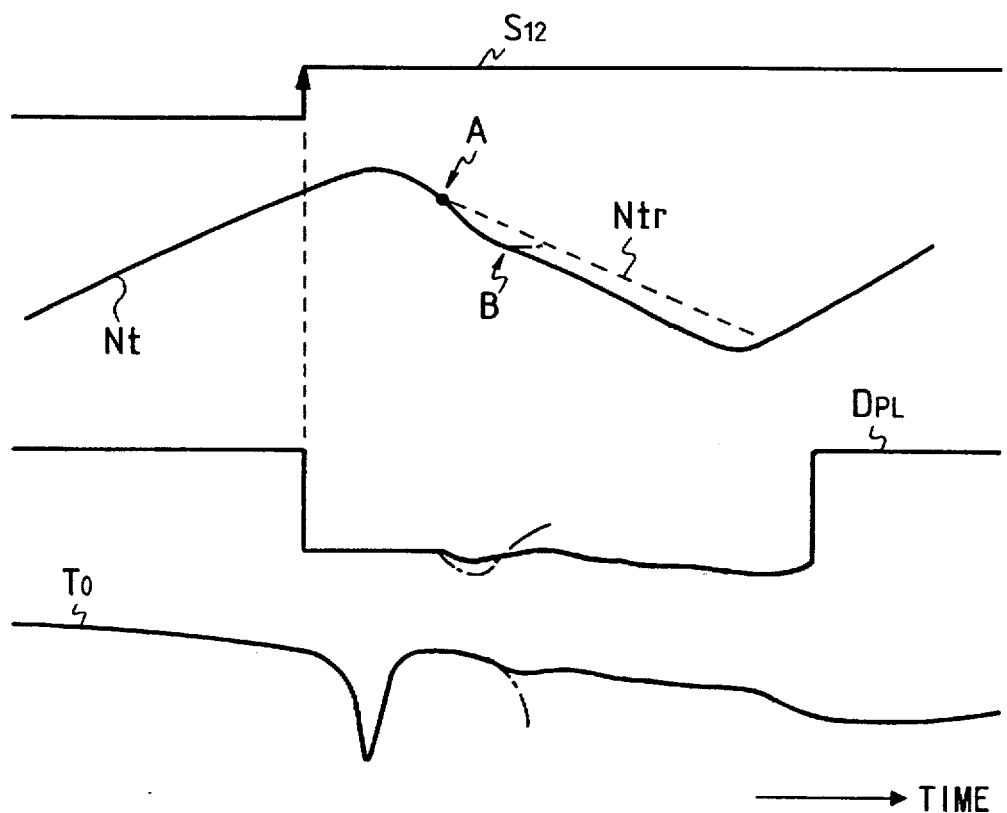
FIGS. 19(a) and 19(b) are explanatory diagrams showing the principle of the third embodiment.

FIG. 19(a) shows the relation among the shift command signal S12 outputted from the gear shift command circuit A1, the input shaft speed Nt, the line pressure control signal DPL, and the output shaft torque To in this embodiment.

A pressure reduction command is issued for preventing the input shaft speed Nt from being decreased greatly at a point A at which the FB control is started. Subsequently, a gradient or rate of change in the input shaft speed Nt is decreased near a point B. If the feedback compensation is made only through the FB pressure compensating circuit A5, the line pressure control signal DPL is changed, as shown by a chain line, in a direction of increasing the line pressure, thereby inducing the vibrations, as shown in FIG. 7 (shown by a chain line in FIG. 19(a)).

Figure 19B:
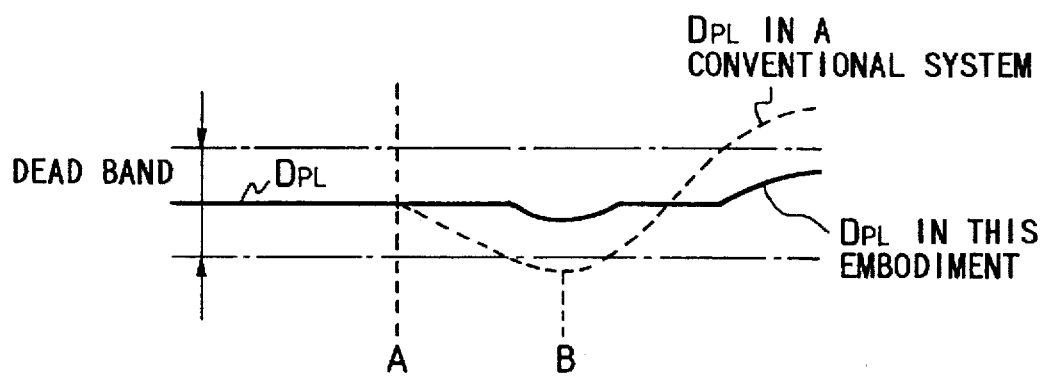

However, in this embodiment, the dead band having a width of 2×Δd, as shown in FIG. 19(b), is provided within a range of variation in the line pressure control signal DPL for suppressing a quick variation in the line pressure control signal DPL due to the delay in response of the hydraulic control system to establish a moderate change in the line pressure control signal DPL. This avoids a sudden increase in the line pressure, resulting in stable hydraulic pressure control suppressing the vibrations.

Figure 20:
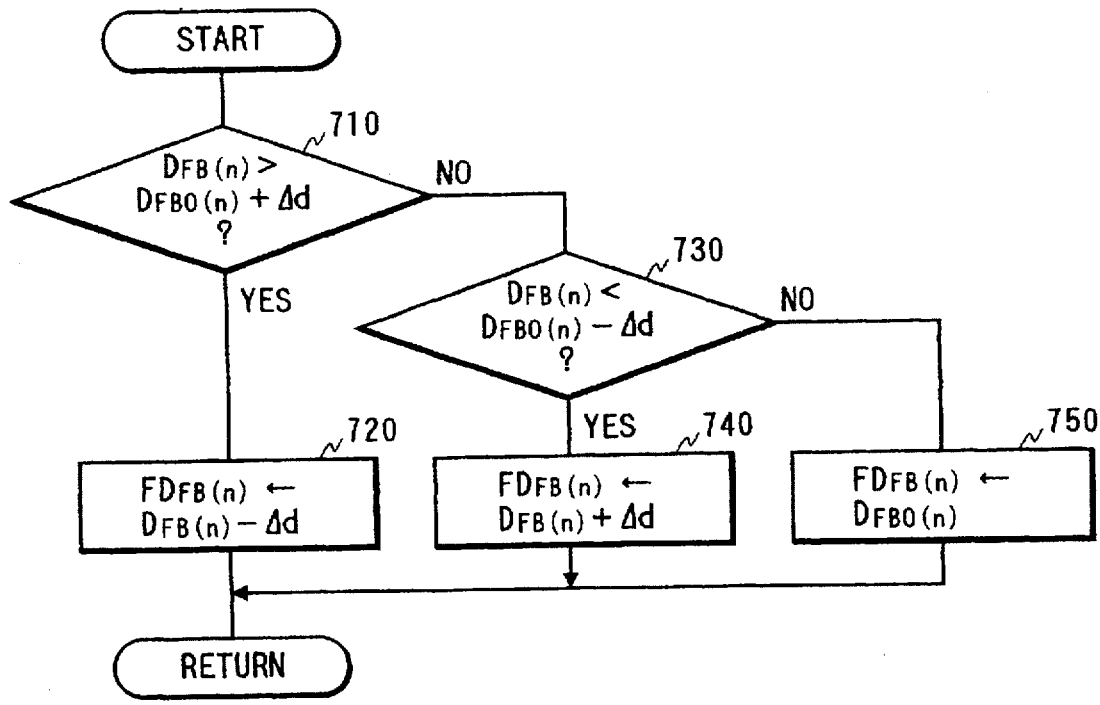
FIG. 20 is a flowchart of a program performed by a transmission control computer of the third embodiment.

An operation of this embodiment will be described below with reference to a flowchart shown in FIG. 20.

After entering the program, the routine proceeds to step 710 wherein it is determined whether the FB compensating pressure value DFB(n) provided by the FB pressure compensating circuit A5 based on a basic pressure command signal DFBO(n) indicating a basic hydraulic pressure characteristic outputted from the gear shift command circuit A1, requires pressure intensification over the dead band Δd (i.e., DFB(n)>DFBO(n)+Δd) or not. The basic hydraulic pressure characteristic represents an ideal waveform of hydraulic pressure during a shift operation and is defined by curves indicating a constant pressure, a moderate increase in pressure, and a moderate decrease in pressure, depending upon characteristics of the hydraulic pressure control system.

If a YES answer is obtained in step 710, then the routine proceeds to step 720 wherein a pressure value corresponding to the dead band Δd is subtracted from the FB compensating pressure value DFB(n) to provide the corrected FB compensating pressure value FDFB(n) (i.e., FDFB(n)←DFB(n)−Δd) through the FB output correcting circuit A6.

If a NO answer is obtained in step 710, then the routine proceeds to step 730 wherein it is determined whether the FB compensating pressure value DFB(n) requires pressure reduction over the dead band Δd (i.e., DFB(n)<DFBO(n)−Δd) or not. If a YES answer is obtained, then the routine proceeds to step 740 wherein the pressure value corresponding to the dead band Δd is added to the FB compensating pressure value DFB(n) to provide the corrected FB compensating pressure value FDFB(n) (i.e., FDFB(n) →DFB(n)+Δd) through the FB output correcting circuit A6.

If a NO answer is obtained in step 730 meaning that the FB compensating pressure value DFB(n) lies within the dead band Δd, then the routine proceeds to step 750 wherein a value of the basic pressure command signal DFBO(n) is set as the corrected FB compensating pressure value FDFB(n).

As apparent from the above discussion, the line pressure control signal DPL is determined based on the corrected FB compensating pressure value FDFB(n) which is determined using the dead band Δd, thereby achieving the stable control, resulting in improved shift quality.

The automatic transmission control system according to the fourth embodiment will be discussed below. The same hardware and software as those of the above first embodiment will be omitted or simply discussed here for the brevity of disclosure.

The automatic transmission control system of this embodiment is different from that of the first embodiment in that the FB compensating pressure value DFB is corrected according to an opening degree of the throttle valve without use of a low-pass filter such as the one used in the FB output correcting circuit A6.

First, the principle of an operation of this embodiment will be discussed below.

Figure 21A:
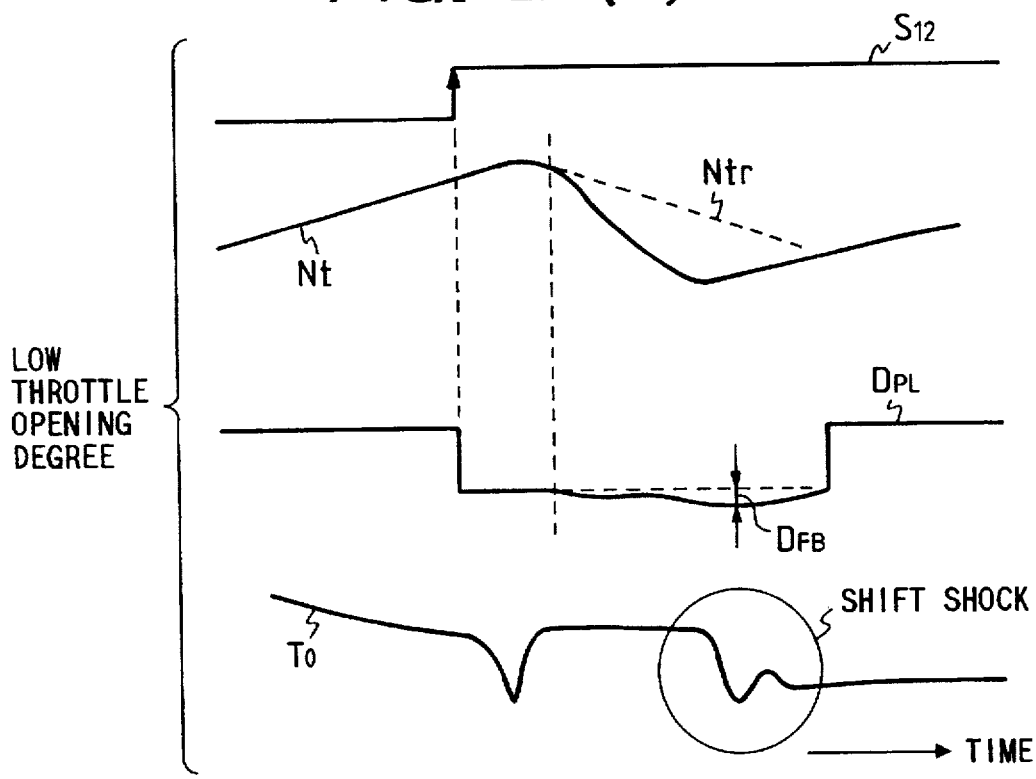
FIGS. 21(a) and 21(b) are explanatory diagrams showing the principle of the fourth embodiment.

When the opening degree of the throttle valve lies a low load range, as shown in FIG. 21(a), the duration for which the input shaft speed Nt is changed during a shift operation is usually short. Thus, the shift operation is almost completed before the hydraulic pressure control follows the variation in the input shaft speed Nt. Specifically, the shift operation is almost completed before the FB compensating pressure value DFB becomes available, thereby making it difficult to control the input shaft speed Nt to follow the target input shaft speed Ntr. This results in shift shock.

Particularly, in this case, since the vehicle speed is relatively low, vehicle occupants feel a greater shift shock.

When shifting is achieved in the range where the opening degree of the throttle valve is small, it is necessary to initiate shift control in the range where the input shaft speed Nt is relatively small. This is because the difference between the input shaft speeds Nt before and after the shift operation is small so that the shift operation is completed in a short time.

Figure 21B:
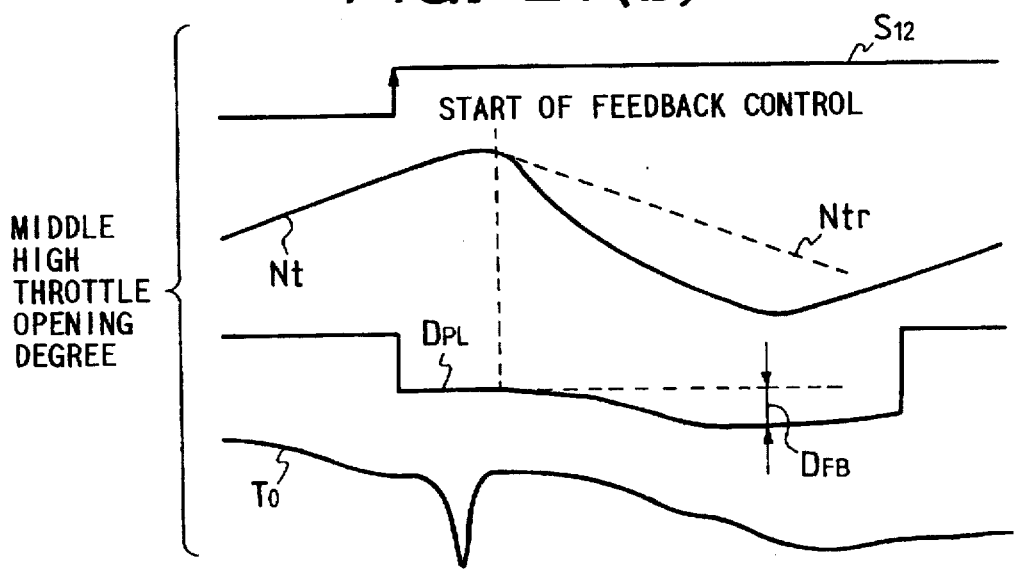

When the opening degree of the throttle valve lies within a middle and high load range, as shown in FIG. 21(b), there is no problem since the duration for which the input shaft speed Nt is changed during the shift operation is long and the hydraulic pressure control is performed after the shift operation is initiated.

For the above reasons, the FB output correcting circuit A6 of this embodiment is designed to amplify the output of the FB pressure compensating circuit A5 (i.e., the FB compensating pressure value DFB) as a function of the opening degree of the throttle valve.

Figure 22:
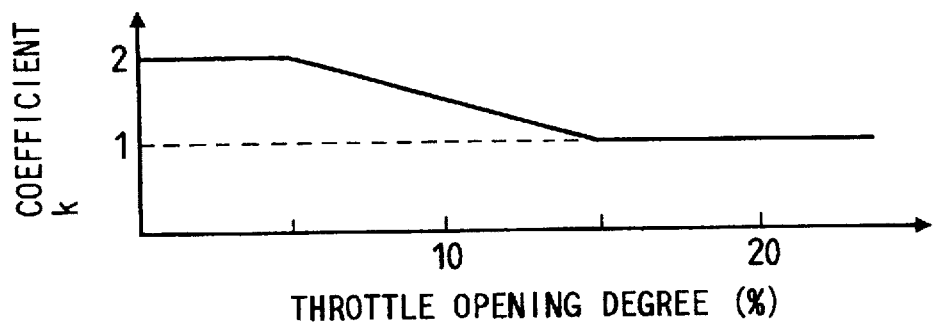
FIG. 22 is a chart which shows the relation between a coefficient k and an opening degree of a throttle valve for use in correcting an output of a FB pressure compensating circuit.

Specifically, the FB output correcting circuit A6 determines the corrected FB compensating pressure value FDFB according to an equation (8) below.

$$FDFB = DFB \times k \tag{8}$$

where k is a coefficient determined according to the opening degree of the throttle valve, as shown in FIG. 22.

Figure 23:
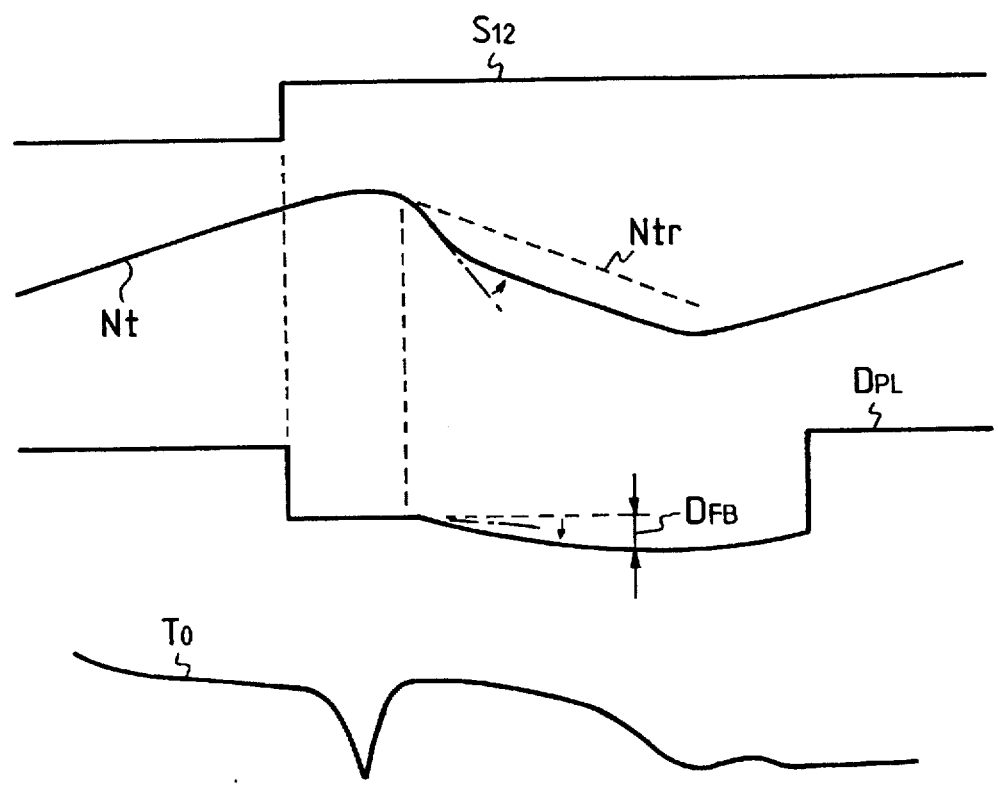
FIG. 23 is a time chart which shows variations in shift command signal S12, input shaft speed Nt, target input shaft speed Ntr, line pressure control signal DPL, and output shaft torque To in the fourth embodiment when a shift operation is performed.

FIG. 23 shows the relation among the shift command signal S12 outputted from the gear shift command circuit A1, the input shaft speed Nt, the line pressure control signal DPL, and the output shaft torque To in this embodiment. As compared with FIG. 21(a), it is found that the FB compensating pressure value DFB after the FB control is initiated is great, thereby causing control of a rate of change in the input shaft speed Nt to be initiated early to prevent the line pressure control signal DPL from being changed, as shown by a chain line in FIG. 23. This avoids the shift shock.

Figure 13:
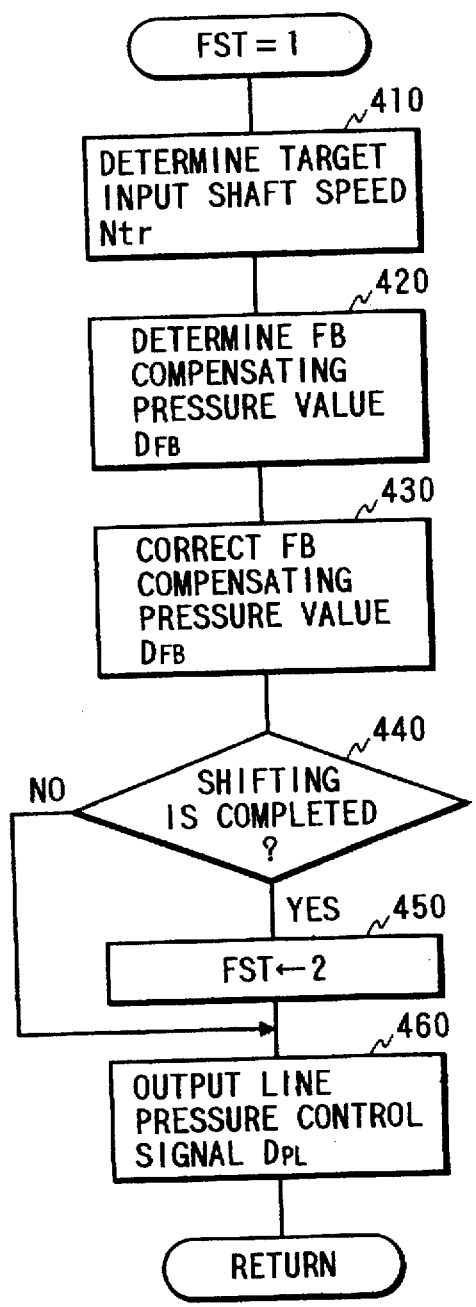

A control program of this embodiment is different from the one shown in FIG. 13 only in that the FB compensating pressure value DFB is corrected using the above equation (8) instead of the operation in step 430, and explanation thereof in detail will be omitted here.

As will be appreciated from the above discussion, the fourth embodiment corrects the output of the FB pressure compensating circuit A5 so as to change a feedback control gain, that is, the corrected FB compensating pressure value FDFB is determined according to the opening degree of the throttle valve. Thus, the feedback control becomes effective even when the opening degree of the throttle valve is small.

The automatic transmission control system according to the fifth embodiment will be discussed below. The same hardware and software as those of the above fourth embodiment will be omitted or simply discussed here for the brevity of disclosure.

The automatic transmission control system of this embodiment determines a control gain of the FB pressure compensating circuit A5 as a function of the opening degree of the throttle valve without use of an FB output correcting circuit such as that of the fourth embodiment.

Figure 24:
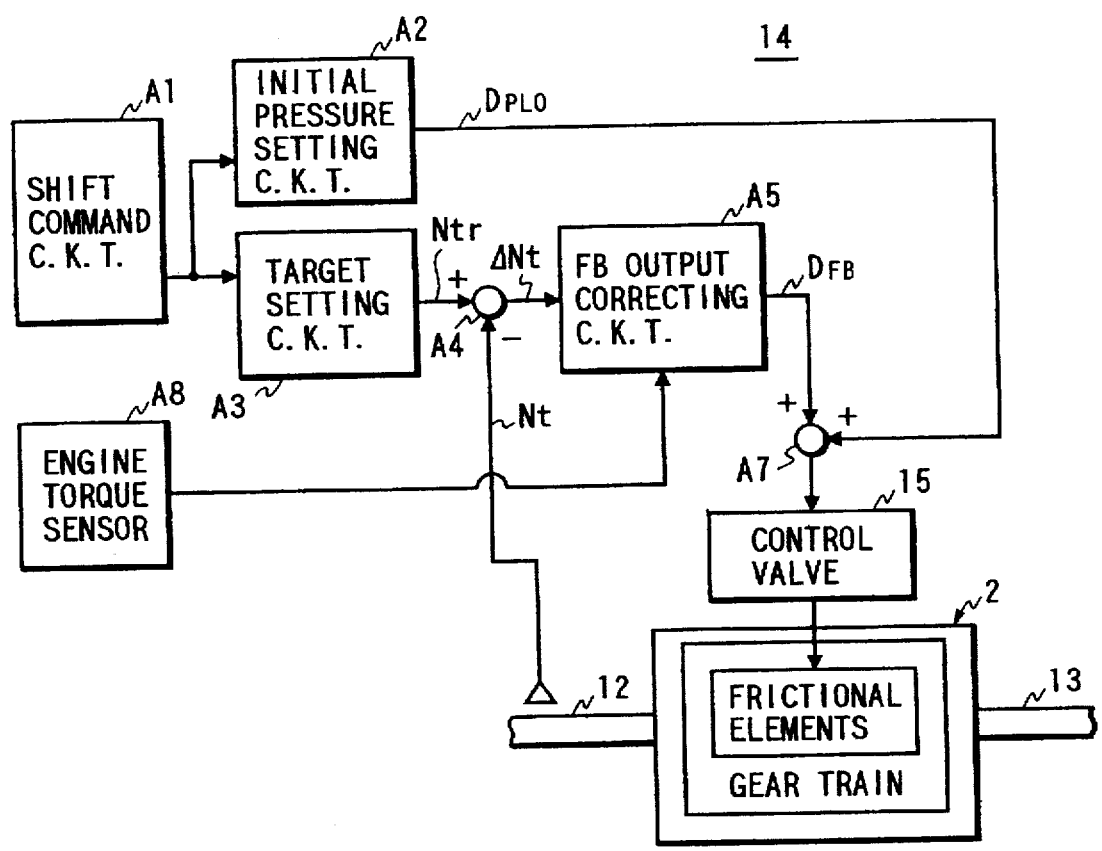
FIG. 24 is a circuit diagram which shows a transmission control computer of an automatic transmission control system of the fifth embodiment.

The automatic transmission control system includes, as shown in FIG. 24, an engine torque sensor A8 which measures an engine torque according to the opening degree of the throttle valve and provides a signal indicative thereof to the FB pressure compensating circuit A5.

The FB pressure compensating circuit A5 determines the FB compensating pressure value DFB according to the following equation (9).

$$DFB(n) = kP \cdot \Delta Nt(n) + kI \cdot \sum_{k=0}^{n} \Delta Nt(k) + kD \cdot (\Delta Nt(n) - \Delta Nt(n-1)) \tag{9}$$

where kP=KP·fP (throttle opening degree), kI=KI·fI (throttle opening degree), and kD=KD·fd (throttle opening degree).

Specifically, the proportional control term kP, the integral control term kI, and the differential control term kD are determined based on gain coefficients (i.e., fP, fI, and fd), respectively, according to the opening degree of the throttle valve. For example, the gain coefficient fP may be determined by the coefficient k as shown in FIG. 22, and the gain coefficients fI and fd may be set to one (1), respectively.

The use of the gain coefficients for control components permits the hydraulic control during a shifting operation to be carried out more finely.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

For example, the above embodiments only refer to an upshift operation of the automatic transmission, but they may be used for another shift operation such as a downshift operation.

The frictional elements may include a multiple disc clutch and a band brake.

This invention may be used with various types of automatic transmission as long as they actuate frictional elements using hydraulic pressure regardless of use of an accumulator and use of a duty or linear type solenoid valve.

What is claimed is:

1. A hydraulic control system for an automatic transmission comprising:

a hydraulic pressure supplying unit which supplies hydraulic pressure to frictional elements of an automatic transmission to engage the frictional elements so that torque transmission is achieved through a drive train connecting an input shaft and an output shaft of the automatic transmission;

a feedback hydraulic controller which controls the hydraulic pressure supplied to the frictional elements of the automatic transmission under feedback control during a shaft operation, the feedback hydraulic controller providing an output to the hydraulic pressure supplying unit to control the hydraulic pressure based on a relation between a speed of the input shaft of the automatic transmission and a target speed; and a hydraulic correcting unit, which receives and corrects the output of the feedback hydraulic controller so as to suppress vibrations of torque transmitted through the drive train of the automatic transmission caused by control of the hydraulic pressure carried out by the feedback hydraulic controller within a range of a resonance frequency of the drive train of the automatic transmission.

2. A hydraulic control system as set forth in claim 1, wherein said hydraulic correcting unit corrects the output of said feedback hydraulic controller so as to eliminate the range of the resonance frequency of the drive train of the automatic transmission.

3. A hydraulic control system as set forth in claim 2, wherein the hydraulic correcting unit includes a low-pass filter which removes frequency components of the output of said feedback hydraulic controller higher than a given value.

4. A hydraulic control system for an automatic transmission comprising:

a hydraulic pressure supplying unit which supplies hydraulic pressure to frictional elements of an automatic transmission to engage the frictional elements so that torque transmission is achieved through a drive train connecting an input shaft and an output shaft of the automatic transmission;

a feedback hydraulic controller which controls the hydraulic pressure supplied to the frictional elements of the automatic transmission under feedback control during a shaft operation, the feedback hydraulic controller providing an output to the hydraulic pressure supplying unit to control the hydraulic pressure based on a relation between a speed of the input shaft of the automatic transmission and a target speed; and a hydraulic correcting unit which corrects the output of the feedback hydraulic controller so as to suppress vibrations of torque transmitted through the drive train of the automatic transmission caused by control of the hydraulic pressure carried out by the feedback hydraulic controller within a range of a resonance frequency of the drive train of the automatic transmission, wherein the hydraulic correcting unit corrects the output of the feedback hydraulic controller so as to eliminate the range of the resonance frequency of the drive train of the automatic transmission and provides a dead band to the output of the feedback hydraulic controller.

5. A hydraulic control system for an automatic transmission comprising:

a shifting mechanism switching torque transmission paths of a drive train connecting an input shaft and an output shaft of an automatic transmission through frictional elements which engages with and disengages from each other according to applied hydraulic pressure;

a hydraulic pressure controller which controls engagement of the frictional elements during a transient period of time in shifting by controlling the hydraulic pressure;

a feedback controller which controls the hydraulic pressure controller, the feedback controller providing an output to the hydraulic pressure controller based on a relation between a rate of change in speed of the input shaft of the automatic transmission and a target rate during shifting to control the hydraulic pressure; and a hydraulic correcting unit which receives and corrects the output of the feedback controller so as to suppress vibrations of torque transmitted through the drive train of the automatic transmission caused by control of the hydraulic pressure carried out by the feedback controller within a range of a resonance frequency of the drive train of the automatic transmission.

6. A hydraulic control system as set forth in claim 5, wherein the hydraulic correcting unit corrects the output of the feedback controller so as to eliminate the range of the resonance frequency of the drive train of the automatic transmission.

7. A hydraulic control system as set forth in claim 6, wherein said hydraulic correcting unit includes a low-pass filter which removes frequency components of the output of the feedback hydraulic unit higher than a given value.

8. A hydraulic control system as set forth in claim 6 wherein the hydraulic correcting unit provides hysteresis to the output of the feedback control unit.

9. A hydraulic control system as set forth in claim 6, wherein the hydraulic correcting unit provides a dead band to the output of the feedback hydraulic unit.

* * * * *

UNITED STATES PATENT AND TRADEMARK OFFICE
CERTIFICATE OF CORRECTION

PATENT NO. : 5,762,581
DATED : June 9, 1998
INVENTOR(S) : Kozaki, et. al.

It is certified that error appears in the above-identified patent and that said Letters Patent is hereby corrected as shown below:

Please add new claim 14 as follows:

--10. A hydraulic control system as set forth in claim 2, wherein said hydraulic correcting means provides hysteresis to the output of said feedback hydraulic control means.--

Signed and Sealed this

Ninth Day of February, 1999

Attest:

*Attesting Officer*

*Acting Commissioner of Patents and Trademarks*